(12) United States Patent
Lee

(10) Patent No.: US 10,791,430 B1
(45) Date of Patent: Sep. 29, 2020

(54) SYSTEM, METHOD AND COMPUTER-READABLE MEDIUM FOR DETERMINING LOCATION OF MOVING TAG BASED ON RADIO SIGNAL

(71) Applicant: KongTech Inc., Seongnam-si, Gyeonggi-do (KR)

(72) Inventor: Hak Kyung Lee, Seongnam-si (KR)

(73) Assignee: KongTech Inc., Seongnam-si (KR)

(*) Notice: Subject to any disclaimer, the term of this patent is extended or adjusted under 35 U.S.C. 154(b) by 0 days.

(21) Appl. No.: 16/679,170

(22) Filed: Nov. 9, 2019

(30) Foreign Application Priority Data

Sep. 6, 2019 (KR) .................. 10-2019-0110405

(51) Int. Cl.
| | |
|---|---|
| *H04W 4/029* | (2018.01) |
| *H04B 17/318* | (2015.01) |
| *H04W 4/021* | (2018.01) |
| *H04W 48/12* | (2009.01) |

(52) U.S. Cl.
CPC .......... *H04W 4/029* (2018.02); *H04B 17/318* (2015.01); *H04W 4/021* (2013.01); *H04W 48/12* (2013.01)

(58) Field of Classification Search
CPC ..... H04W 4/029; H04W 4/021; H04W 48/12; H04B 17/318
See application file for complete search history.

(56) References Cited

U.S. PATENT DOCUMENTS

| | | | | |
|---|---|---|---|---|
| 2008/0186233 | A1* | 8/2008 | McCoy | G06Q 10/087 342/444 |
| 2019/0205936 | A1* | 7/2019 | Lal | H04W 4/12 |
| 2019/0362304 | A1* | 11/2019 | Vivas Suarez | G06K 19/0723 |

FOREIGN PATENT DOCUMENTS

| | | |
|---|---|---|
| KR | 10-2012-0040010 A | 4/2012 |
| KR | 10-2015-0078102 A | 7/2015 |
| KR | 10-1551720 B1 | 9/2015 |
| KR | 10-2016-0122454 A | 10/2016 |
| KR | 10-2018-0130761 A | 12/2018 |
| KR | 10-2019-0021957 A | 3/2019 |

OTHER PUBLICATIONS

An Office Action mailed by the Korean Intellectual Property Office dated Oct. 28, 2019, which corresponds to Korean Patent Application No. 10-2019-0110405 and is related to U.S. Appl. No. 16/679,170.
An Office Action mailed by the Korean Intellectual Property Office dated Oct. 28, 2019, which corresponds to Korean Patent Application No. 10-2019-0110408 and is related to U.S. Appl. No. 16/679,170.

* cited by examiner

*Primary Examiner* — Marisol Figueroa
(74) *Attorney, Agent, or Firm* — Studebaker & Brackett PC

(57) ABSTRACT

The present invention relates to a system, a method and a computer-readable medium for determining a location of a moving tag based on a radio signal, and more particularly, to a system, a method and a computer-readable medium for determining a location of a moving tag based on a radio signal, in which a moving tag processes data through radio communication between a beacon scanner and the moving tag, and generates and transmits information for determining the location of the moving tag, so that the location of the moving tag can be determined.

13 Claims, 18 Drawing Sheets

FIG. 12 A

| EQUIPMENT TYPE | DOOR NUMBER | ACCESS TYPE | OTHER INFORMATION | MAJOR | MINOR |
|---|---|---|---|---|---|
| 0x01 | 0x01 | 0x00 | 0x02 | 0x0100 | 0x0000 |

FIG. 12 B

| EQUIPMENT TYPE | DOOR NUMBER | ACCESS TYPE | OTHER INFORMATION | MAJOR | MINOR |
|---|---|---|---|---|---|
| 0x01 | 0x01 | 0x00 | 0x03 | 0x0200 | 0x0000 |

FIG. 13 A

| EQUIPMENT TYPE | DOOR NUMBER | ACCESS TYPE | OTHER INFORMATION |
|---|---|---|---|
| 0x04 | 0x00 | 0x00 | 0x02 |

FIG. 13 B

| EQUIPMENT TYPE | DOOR NUMBER | ACCESS TYPE | OTHER INFORMATION |
|---|---|---|---|
| 0x04 | 0x01 | 0x01 | 0x03 |

FIG. 17
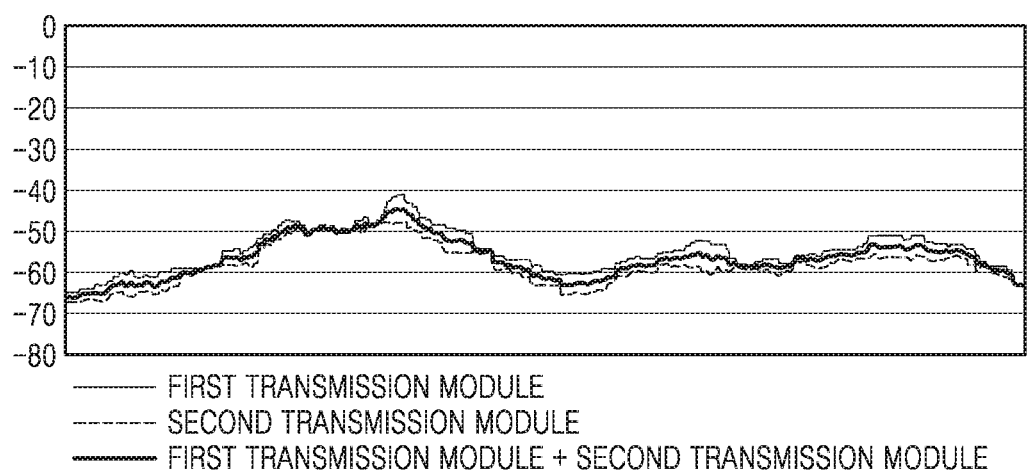
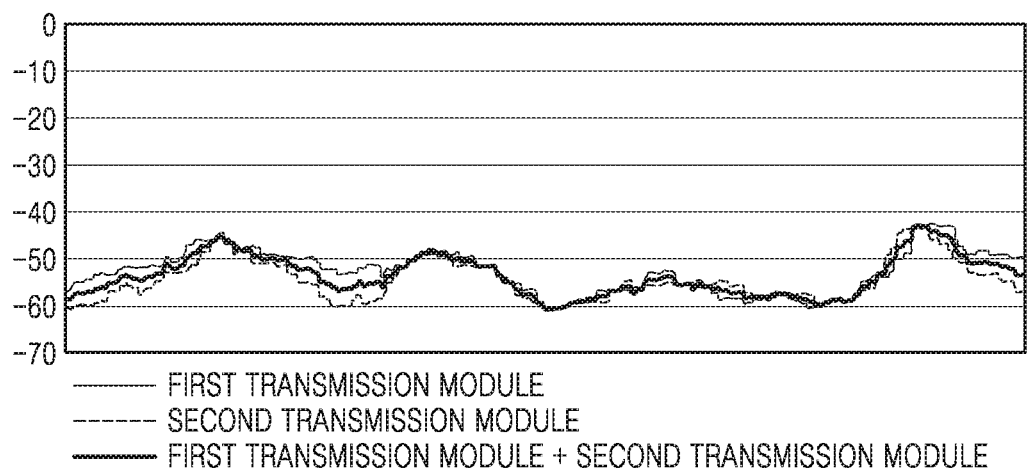

SYSTEM, METHOD AND COMPUTER-READABLE MEDIUM FOR DETERMINING LOCATION OF MOVING TAG BASED ON RADIO SIGNAL

CROSS-REFERENCE TO RELATED APPLICATION

This application claims priority to Korean Patent Application No. 10-2019-0110405 filed Sep. 6, 2019 with the Korean Intellectual Property Office, the contents of which are incorporated herein by reference.

BACKGROUND OF THE INVENTION

1. Field of the Invention

The present invention relates to a system, a method and a computer-readable medium for determining a location of a moving tag based on a radio signal, and more particularly, to a system, a method and a computer-readable medium for determining a location of a moving tag based on a radio signal, in which a moving tag processes data through radio communication between a beacon scanner and the moving tag, and generates and transmits information for determining the location of the moving tag, so that the location of the moving tag can be determined.

2. Description of the Related Art

An access management system is a system that recognizes and manages an accessor who intends to enter and exit a specific space through a door. Currently, the access management system is widely used in general offices and at homes as well as in access control facilities kept with high security.

As the access management system, various access management systems have been commercialized, such as a system in which a security card using a radio frequency identification (RFID) or a near field communication (NFC) is given to an accessor to allow the accessor to tag the security card, or a biometric system using fingerprint recognition and iris recognition.

However, since the main purpose of the conventional access management system is to determine whether the access of the person entering is authorized, it is often difficult to verify real-time access information such as going out or returning of the accessor.

Meanwhile, a BLE communication is a technology using Bluetooth 4.0 or higher and the technology has attracted attention in modern society because of a wider communication range, high accuracy, and low power consumption compared to the existing Bluetooth communication.

According to the above trend, attention for an access management system, which uses a beacon using the BLE communication, has also increased recently. The access management system utilizing the beacon can track not only an access permission of the accessor, but also continuous access information such as entrance and going out of the accessor.

However, the conventional access management system using the beacon may recognize a location of a moving transmitter by receiving a signal of the transmitter configured to transmit a radio signal from a receiver fixed inside and outside and comparing signal intensity differences. Because the beacon consumes less power, the beacon seems suitable for a system in which moving objects transmit signals. However, when the number of moving equipment increases, the amount of data to be processed grows exponentially. To solve the conventional problems, there is a need for a technology that can extract location information by performing a signal processing in the moving equipment, and transmit only the extracted location information to a service server. However, the conventional technology for providing the above service does not exist at all.

SUMMARY OF THE INVENTION

The present invention provides a system, a method and a computer-readable medium for determining a location of a moving tag based on a radio signal, in which a moving tag processes data through a radio communication between a beacon scanner and the moving tag, and information for determining the location of the moving tag is generated and transmitted, so that the location of the moving tag can be determined.

To this end, the present invention provides a system for determining a location of a moving tag based on a radio signal, which includes: a plurality of beacon scanners configured to broadcast scanner signals including device-dedicated information; a moving tag configured to receive the scanner signals from the beacon scanners, and operable in an active mode configured to broadcast a second beacon signal based on received intensities of the scanner signals the second beacon signal includes determination information related to device-dedicated information of at least one of the beacon scanners, and tag-dedicated information of the moving tag.

In one embodiment of the present invention, the determination information may include information related to device-dedicated information of a beacon scanner that transmits a scanner signal having a highest reception intensity in the moving tag among the scanner signals.

In one embodiment of the present invention, the moving tag may perform: a signal collecting step of collecting scanner signals transmitted from the beacon scanners; a signal filtering step of extracting a filter reception intensity filtered using a predetermined scheme with respect to reception intensity of the collected scanner signal; a determination step of extracting determination information related to device-dedicated information of at least one among the beacon scanners based on a plurality of filter reception intensities of the scanner signals of the beacon scanners; and a broadcasting step of broadcasting the second beacon signal.

In one embodiment of the present invention, the moving tag may store filtered filter reception intensity determined in the previous step and a predictor variable determined in the previous step, with respect to each scanner signal received from each beacon scanner, and may update the signal intensity of the scanner signal received at a current step, filtered filter reception intensity determined in the previous step, and filter reception intensity and a predictor variable filtered on a basis of the predictor variable determined in the previous step.

In one embodiment of the present invention, the beacon scanner may transmit the location information of the moving tag extracted on a basis of the second beacon information received from the moving tag, to the service server.

In one embodiment of the present invention, the moving tag may operate in a normal mode of broadcasting the first beacon signal including the tag-dedicated information. When the moving tag operates in the normal mode, and the reception intensity of the first beacon signal of the moving tag received by the beacon scanner corresponds to a predetermined criterion, the beacon scanner may request the moving tag to switch the operation mode of the moving tag from the normal mode to an active mode.

In one embodiment of the present invention, a broadcasting interval of the second beacon signal in the active mode may be shorter than a broadcasting interval of the first beacon signal in the normal mode.

In one embodiment of the present invention, the beacon scanner may include: at least one transmission module configured to transmit the scanner signal; a trigger module configured to receive the first beacon signal and request the moving tag to switch the operation mode of the moving tag from the normal mode to the active mode; and a reception module configured to receive the second beacon signal.

In one embodiment of the present invention, the beacon scanner includes a trigger module configured to receive the first beacon signal and request the moving tag to switch the operation mode of the moving tag from the normal mode to the active mode, wherein the trigger module includes: receiving a first beacon signal; determining whether the signal intensity of the first beacon signal is within a predetermined range; requesting a scan response from the moving tag; receiving the scan response from the moving tag; and requesting a mode switching into the active mode while transmitting a key value to the moving tag, and wherein the moving tag may perform verification on the key value, and perform the mode switching into the active mode.

To solve the above problem, one embodiment of the present invention provides a method for determining a location of a moving tag based on a radio signal, which includes: a first broadcasting step, in a plurality of beacon scanners, of broadcasting a scanner signal including device-dedicated information; and a second broadcasting step, in the moving tag, of receiving the scanner signals from the beacon scanners, and operating in an active mode configured to broadcast a second beacon signal based on reception intensities of the scanner signals, wherein the second beacon signal includes determination information related to device-dedicated information of at least one among the beacon scanners, and tag-dedicated information of the moving tag.

In one embodiment of the present invention, the determination information may include information related to device-dedicated information of a beacon scanner that transmits a scanner signal having a highest reception intensity in the moving tag among the scanner signals.

In one embodiment of the present invention, the active mode may perform: a signal collecting step of collecting scanner signals transmitted from the beacon scanners; a signal filtering step of extracting a filter reception intensity filtered using a predetermined scheme with respect to reception intensities of the collected scanner signals; a determination step of extracting determination information related to device-dedicated information of at least one among the beacon scanners, based on a plurality of filter reception intensities of the scanner signals of the beacon scanners; and a broadcasting step of broadcasting the second beacon signal.

In one embodiment of the present invention, the extracting the filter reception intensity filtered using the predetermined scheme in the signal filtering step may include: storing filtered filter reception intensity determined in the previous step, and the predictor variable determined in the previous step, with respect to each scanner signal received from each beacon scanner, and updating the signal intensity of the scanner signal received at a current step, filtered filter reception intensity determined in the previous step, and filter reception intensity and a predictor variable filtered on a basis of the predictor variable determined in the previous step.

The one embodiment of the present invention may further include a result transmitting step, in the beacon scanner, of transmitting the location information of the moving tag, which is extracted based on the second beacon information received from the moving tag, to a service server.

In one embodiment of the present invention, in the second broadcasting step, when the moving tag may operate in the normal mode of broadcasting the first beacon signal including the tag-dedicated information. When the moving tag operates in the normal mode, and the reception intensity of the first beacon signal of the moving tag received by the beacon scanner corresponds to a predetermined criterion, a mode switching step, by the beacon scanner, of requesting the moving tag to switch the operation mode of the moving tag from the normal mode to the active mode may be further included.

In one embodiment of the present invention, a broadcasting interval of the second beacon signal in the active mode may be shorter than a broadcasting interval of the first beacon signal in the normal mode. In one embodiment of the present invention, the method for determining a location of a moving tag based on a radio signal further includes: a trigger step, in the beacon scanner, of receiving the first beacon signal and requesting the moving tag to change the operation mode of the moving tag from the normal mode to the active mode, wherein the trigger step includes: receiving a first beacon signal; determining whether the signal intensity of the first beacon signal is within a predetermined range; requesting a scan response from the moving tag; receiving the scan response from the moving tag; and requesting a mode switching into the active mode while transmitting a key value to the moving tag. The method for determining a location of a moving tag based on a radio signal may further include: performing, in the moving tag, verification on the key value, and performing a mode switching into the active mode.

According to one embodiment of the present invention, location information of the moving tag extracted from the moving tag is transmitted to the beacon scanner, and the service server determines the location of the moving tag based on the received location information, so that an overload of data processing can be reduced.

According to one embodiment of the present invention, an area to be recognized is classified so that the location such as entering and exiting the door can be clearly determined.

According to one embodiment of the present invention, the beacon scanner processes signals by using a plurality of processors, and thus an unstable signal of the BLE communication using a signal having a high frequency band is stabilized, so that accurate data can be extracted.

According to one embodiment of the present invention, a Kalman filter is used on a large number of received data to extract information based on the most up-to-dated data without accumulating all the data, so that the efficiency of signal processing can be improved.

According to one embodiment of the present invention, the beacon signal is not transferred when the user does not use the moving tag, by switching a sleep mode, a normal mode, an active mode provided to the moving tag, so that the battery power consumption can be minimized.

BRIEF DESCRIPTION OF THE DRAWINGS

FIGS. 12A and 12B are views schematically showing a packet configuration of data transmitted from a beacon scanner according to one embodiment of the present invention.

FIGS. 13A and 13B are views schematically showing a packet configuration of data transmitted from a moving tag view according to one embodiment of the present invention.

FIG. 17 is a view schematically showing a graph indicating a sum value extracted by summing up a filtered signal intensity value, which is extracted by performing the signal filtering step of the moving tag, with respect to each beacon scanner according to one embodiment of the present invention.

DETAILED DESCRIPTION OF THE INVENTION

Figure 1:
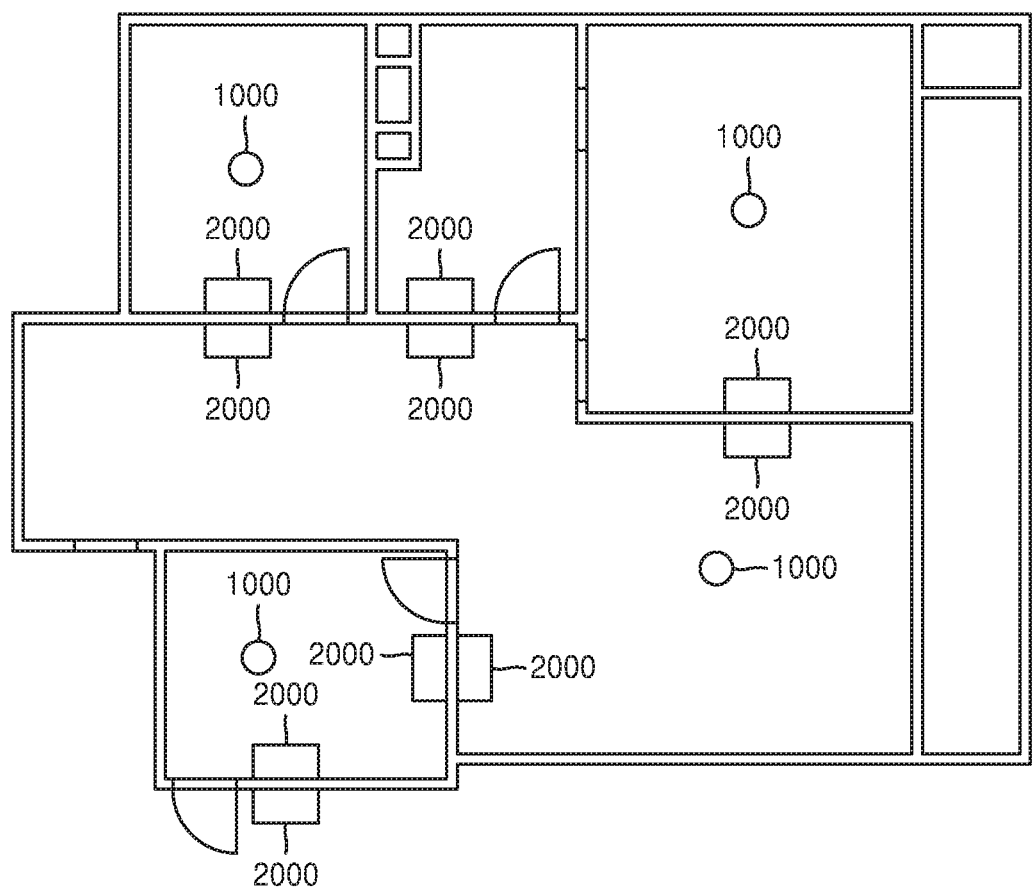
FIG. 1 is a view schematically showing an installation example of a system for determining a location of a moving tag based on a radio signal according to one embodiment of the present invention.

Hereinafter, embodiments of the present invention will be described in detail with reference to the accompanying drawings such that a person having ordinary skill in the art may easily carry out the embodiments of the present invention. However, the present invention may be embodied in various different forms and is not limited to the embodiments described herein. In addition, parts irrelevant to the description are omitted in the drawings to clearly describe the present invention, and like reference numerals designate like parts throughout the specification.

Throughout the specification, when one part is "connected" to another part, the above expression includes not only "directly connected" but also "electrically connected" in which another element is interposed therebetween. In addition, when one part "includes" a component, the above expression does not exclude other components, but may further include the other components, unless particularly stated otherwise.

In addition, the terms including an ordinal number such as first and second may be used to describe various components, but the components not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In the present specification, the term 'unit' includes a unit implemented by hardware, a unit implemented by software, and a unit implemented by both of the hardware and the software. In addition, one unit may be implemented using at least two pieces of hardware, and at least two units may be implemented by one piece of hardware. Meanwhile, "~ unit" may not be limited to software or hardware, may be configured to be present in an addressable storage medium, and may be configured to reproduce at least one processor. Accordingly, as an example, the '~ unit' includes components such as software components, object-oriented software components, class components, and task components, processes, functions, attributes, procedures, subroutines, segments of program code, drivers, firmware, microcode, circuits, data, databases, data structures, tables, arrays, and variables. The functionality provided within the components and the '~ unit's may be combined into a smaller number of components and '~ unit's or further separated into additional components and the '~ unit's. In addition, the components and '~ unit's may be implemented to reproduce at least one CPU in a device or a secure multimedia card.

FIG. 1 schematically shows an installation example of a system for determining a location of a moving tag 1000 based on a radio signal according to one embodiment of the present invention.

FIG. 1 shows at least two beacon scanners 2000 that constitute the system for determining the location of the radio signal-based moving tag 1000 of the present invention, and at least one moving tag 1000 as a subject for the location determination.

The at least two beacon scanners 2000 may be installed in front of and behind a wall between the beacon scanners. The at least one moving tag 1000 may be moved while being carried by a user or may be attached to various articles carried by the user, so that a location of the moving tag 1000 may be detected. The moving tag 1000 may repeatedly transmit a beacon signal. Although four moving tags 1000 are shown in FIG. 1, the number of moving tags 1000 as subjects to detect the location by the system for determining the location according to the present invention is not limited. The beacon scanners 2000 are installed one by one in both directions of a wall with respect to a door for an area configured to determine an entry and an exit of the moving tag 1000. At least two beacon scanners 2000 may be installed according to a size or shape of a building or space installed with the system for determining the location of the moving tag 1000.

Figure 2:
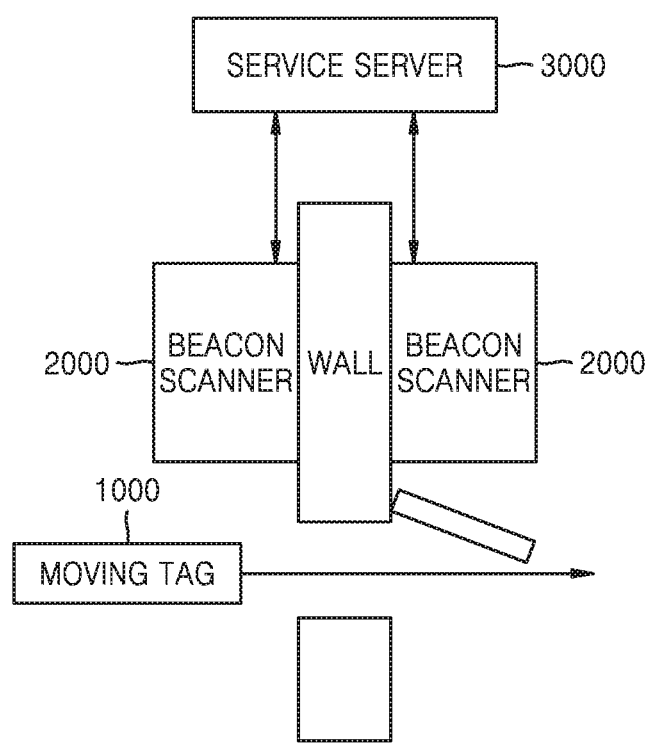
FIG. 2 is a view schematically showing a configuration of a system for determining a location of a moving tag based on a radio signal according to one embodiment of the present invention.

FIG. 2 schematically shows a configuration of the system for determining the location of the radio signal-based moving tag 1000 according to one embodiment of the present invention.

A service server 3000 of FIG. 2 corresponds to a computing device including at least one processor and at least one memory. As shown in FIG. 2, the beacon scanners 2000 may be installed one by one in both directions of the in-between wall of a space such as a building or room. The moving tag 1000 may wirelessly communicate with the beacon scanner 2000 while being adjacent to or passing through the door of the building or space. The beacon scanner 2000 may transmit a scanner signal and receive a first beacon signal and a second beacon signal, and the moving tag 1000 may receive the scanner signal and transmit the beacon signals to the beacon scanner 2000. The beacon scanner 2000 may receive the second beacon signal including determination information for determining the location of the moving tag 1000 from the moving tag 1000, and may transmit location information of the moving tag 1000 to the service server 3000. The beacon scanners 2000 are installed one by one in the both directions of the wall with respect to the door for the area configured to determine the entry or exit of the moving tag 1000, thereby determining whether the moving tag 1000 enters the corresponding area, so that the location of the moving tag 1000 can be determined more accurately.

Figure 3:
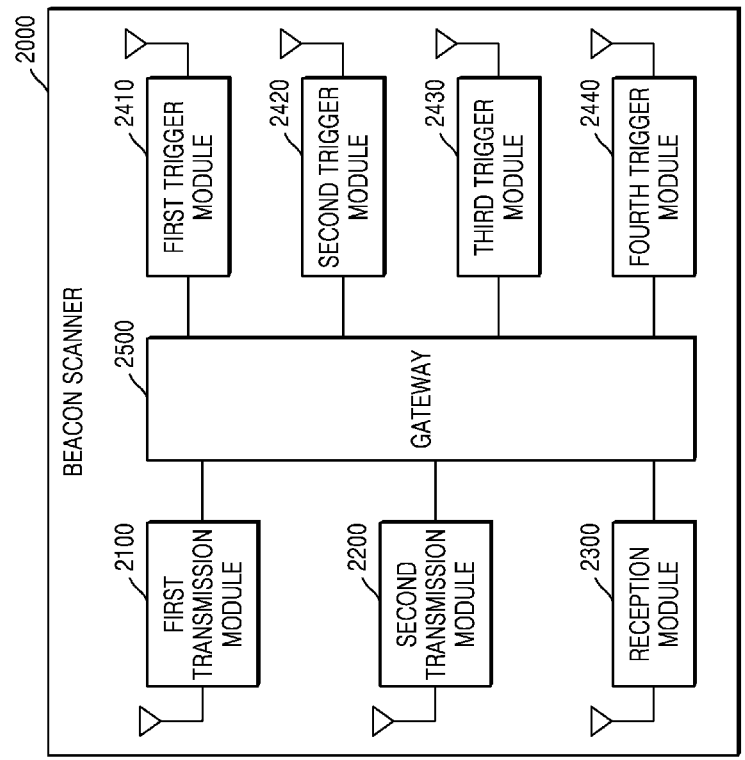
FIGS. 3A and 3B are views schematically showing internal configurations of beacon scanners according to one embodiment of the present invention.
Figure 3:
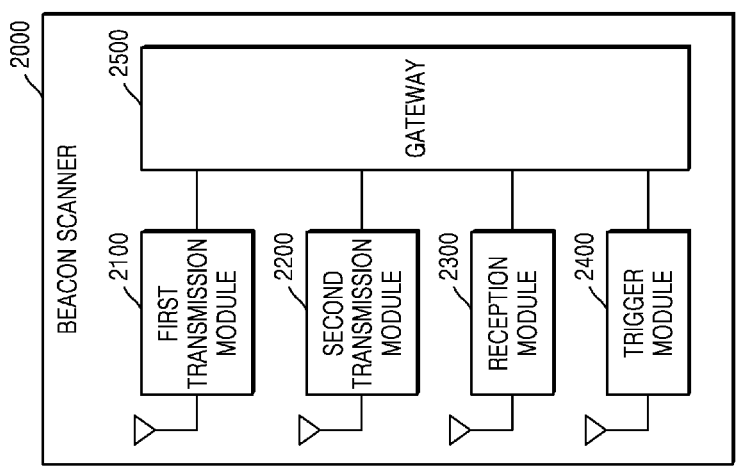

FIGS. 3A and 3B schematically show internal configurations of the beacon scanner 2000 according to one embodiment of the present invention.

The beacon scanner 2000 of the present invention includes: at least one transmission module configured to transmit the scanner signal; a trigger module 2400 configured to receive the first beacon signal and request the moving tag 1000 to switch an operation mode of the moving tag 1000 from a normal mode to an active mode; and a reception module 2300 configured to receive the second beacon signal.

As shown in FIG. 3A, the beacon scanner 2000 includes a first transmission module 2100, a second transmission module 2200, a reception module 2300, and a trigger module 2400. The first transmission module 2100, the second transmission module 2200, the reception module 2300, and the trigger module 2400 may each operate as an individual processor. In addition, the first transmission module 2100, the second transmission module 2200, the reception module 2300, and the trigger module 2400 include antennas, respectively. In one embodiment of the present invention, the antenna included in each of the modules of the beacon scanner 2000 may be a directional antenna. When a signal received by using the directional antenna is processed through filtering, more accurate data can be obtained, compared to a signal received by using a non-directional antenna. The processor may be configured to process instructions of a computer program by performing a basic arithmetic, a logic, and an input-output operation of image optimization method for compressed package files.

The transmission module transmits a scanner signal to the moving tag 1000. The scanner signal is transmitted while including device-dedicated information of the beacon scanner 2000. Although FIG. 3A shows the first transmission module 2100 and the second transmission module 2200, the transmission module is not limited to the two transmission modules, and the beacon scanner 2000 having more transmission modules may be used as needed.

The moving tag 1000 may extract determination information for determining whether to enter or exit a predetermined area (or door) based on reception intensities of scanner signals received from the first transmission module 2100 and the second transmission module 2200, and may transmit the determination information to the beacon scanner 2000.

The reception module 2300 receives a beacon signal received from at least one moving tag 1000. The moving tag 1000 receives a plurality of scanner signals from the beacon scanner 2000, and transmits determination information including information related to the device-dedicated information of the beacon scanner 2000 that has transmitted a scanner signal having the highest reception intensity, and a second beacon signal including tag-dedicated information of the moving tag 1000. The reception module 2300 of the beacon scanner 2000 receives the second beacon signal transmitted by the moving tag 1000. The received second beacon signal may be transmitted to the service server 3000 to become information used as a basis for determining the location of the moving tag 1000.

The trigger module 2400 requests a switching of the operation mode of the moving tag 1000 from the normal mode to the active mode. Specifically, when it is determined that the moving tag 1000 enters a predetermined area of the beacon scanner 2000, the trigger module 2400 may request the moving tag 1000 to switch the operation mode. The moving tag 1000 having received the request for switching the operation mode from the trigger module 2400 may switch the operation mode from the normal mode to the active mode.

In addition, when determining that the moving tag 1000 enters the predetermined area, the trigger module 2400 may generate a trigger for requesting the moving tag 1000 to switch the operation mode after determining whether the reception intensity of the scanner signal transmitted by the moving tag 1000 is within a predetermined range.

The transmission module, the reception module 2300 and the trigger module 2400 correspond to a BLE communication module. According to the present invention, since the moving tag 1000 collects each data and directly performs a complicated operation or the like, high computational load and storage load may be required to the moving tag 1000. In order to solve the disadvantage, an active mode module 1300 of the moving tag 1000 may separately operate in a transmission mode and a reception mode as needed.

As shown in FIG. 3A, the at least one transmission module, reception module 2300 and trigger module 2400 may be connected to a gateway 2500, and the second beacon signal received from the moving tag 1000 through the gateway 2500 may be transmitted to the service server 3000.

Meanwhile, in another embodiment of the present invention, the beacon scanner 2000 may include: at least one transmission module configured to transmit the scanner signal; at least one trigger module 2400 configured to receive the first beacon signal and request the moving tag 1000 to change an operation mode of the moving tag 1000 from a normal mode to an active mode; and a reception module 2300 configured to receive the second beacon signal.

As shown in FIG. 3B, the beacon scanner 2000 includes a first transmission module 2100, a second transmission module 2200, a reception module 2300, a first trigger module 2410, a second trigger module 2420, and a third trigger module 2430, and a fourth trigger module 2440. According to the system for determining the location of the moving tag of the present invention, the number of moving tags 1000 may increase as needed without limiting the number of moving tags 1000 to be determined by the location. When the number of moving tags 1000 increases, more processors are required to request the moving tags 1000 to switch the operation mode. Accordingly, as shown in FIG. 3B, more moving tags 1000 can be covered by increasing the number of trigger modules 2400 to at least one, and a communication can be smoothly performed without an overload upon requesting the moving tags 1000 to switch the operation mode.

In addition, the transmission module and the reception module 2300 also are not limited to FIG. 3B, and the beacon scanner 2000 including at least one transmission module and the reception module 2300 may be implemented as needed.

Figure 4:
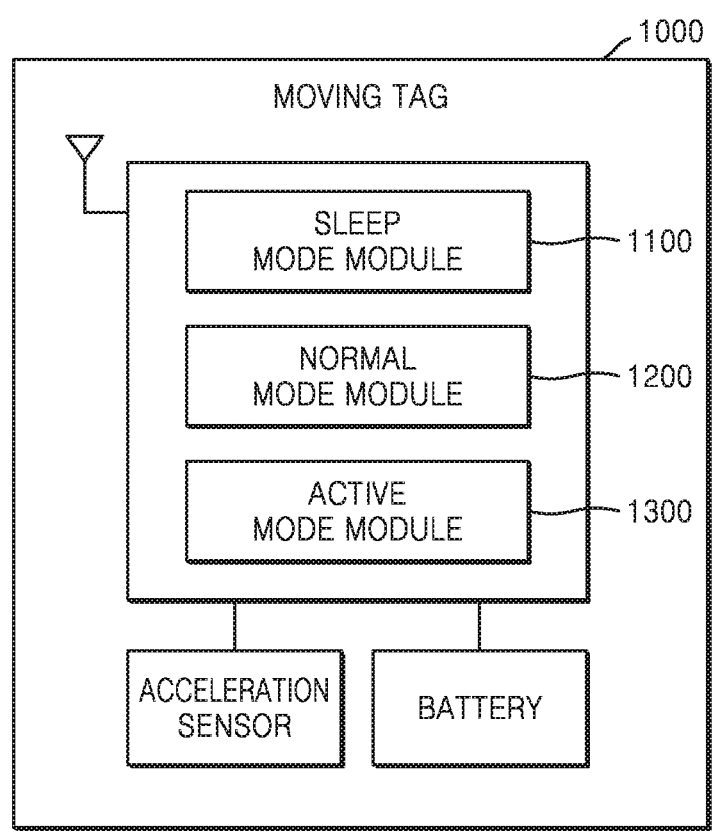
FIG. 4 is a view schematically showing an internal configuration of a moving tag according to one embodiment of the present invention.

FIG. 4 schematically shows an internal configuration of the moving tag 1000 according to one embodiment of the present invention.

The moving tag 1000 of the present invention may perform one of a normal mode of broadcasting the first beacon signal including the tag-dedicated information, and an active mode of receiving a plurality of scanner signals from a plurality of beacon scanners 2000, and broadcasting the second beacon signal based on reception intensities of the scanner signals.

As shown in FIG. 4, the moving tag 1000 may include a sleep mode module 1100, a normal mode module 1200, and an active module. In addition, the moving tag 1000 may include an acceleration sensor and a battery. Specifically, the moving tag 1000 may execute any one of the sleep mode, the normal mode and the active mode, and may not transmit and receive the radio signal, may only transmit the radio signal, or may transmit and receive the radio signal, according to the operation mode. The moving tag 1000 measures a movement of the moving tag 1000 based on acceleration information measured by the acceleration sensor accommodated in the moving tag 1000.

The sleep mode module 1100 measures the movement by the acceleration sensor, and executes the sleep mode when there is no movement for a predetermined time.

The general mode module 1200 executes the normal mode when the movement is detected by the acceleration sensor.

The active mode module 1300 executes the active mode when a trigger occurs from the trigger module 2400 of the beacon scanner 2000.

Hereinafter, the sleep mode, the normal mode, and the active mode, in which the moving tag 1000 operates, will be described in more detail.

Figure 5:
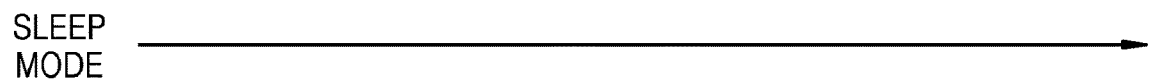
FIGS. 5A-5C are views schematically showing a signal transmission/reception scheme for each operation mode of the moving tag according to one embodiment of the present invention.
Figure 5:
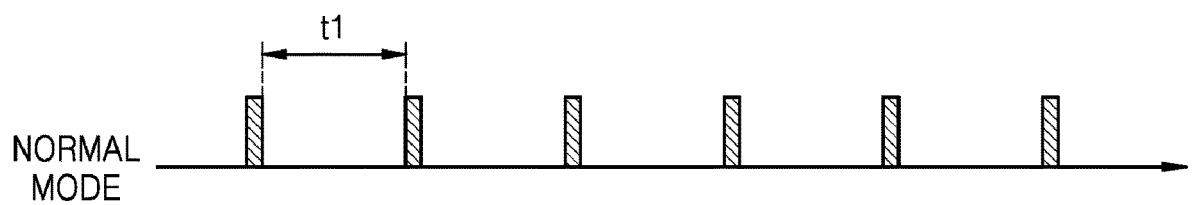
Figure 5:
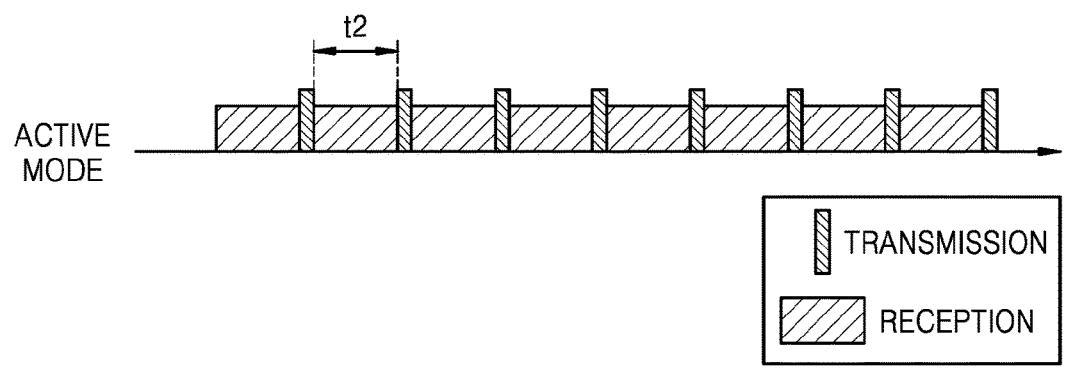

FIGS. 5A-5C schematically shows a signal transmission/reception scheme for each operation mode of the moving tag 1000 according to one embodiment of the present invention.

As shown in FIG. 5A, the sleep mode operated by the sleep mode module 1100 of the moving tag 1000 denotes a mode in which any radio signal is not transmitted or received. The moving tag 1000 operating in the sleep mode does not broadcast a beacon signal and does not scan a scanner signal. When operating in the sleep mode, the moving tag 1000 has the lowest power consumption of the battery.

As shown in FIG. 5B, the general mode operated by the general mode module 1200 of the moving tag 1000 denotes a mode in which the radio signal is transmitted but not received. The moving tag 1000 operating in the normal mode may broadcast the beacon signal to the beacon scanner 2000, but does not scan the scanner signal. A broadcasting interval t1 of the first beacon signal broadcast by the moving tag 1000 operating in the normal mode may be longer than a broadcasting interval t2 of the second beacon signal broadcast by the moving tag 1000 operating in the active mode.

As shown in FIG. 5C, the active mode operated by the active mode module 1300 of the moving tag 1000 denotes a mode in which the radio signal is transmitted and received. The moving tag 1000 operating in the active mode may broadcast the beacon signal to the beacon scanner 2000, and may receive the scanner signal broadcast by the beacon scanner 2000. The moving tag 1000 may receive a plurality of scanner signals during a predetermined reception time, and extract determination information related to at least one device-dedicated information based on the scanner signals. When the predetermined reception time elapses and a transmission time comes, a second beacon signal including the determination information extracted based on the scanner signals is transmitted. The broadcasting interval t2 of the second beacon signal broadcast by the moving tag 1000 operating in the active mode may be shorter than the broadcasting interval t1 of the first beacon signal broadcast by the moving tag 1000 operating in the normal mode.

Accordingly, the moving tag 1000 repeatedly broadcasts the beacon signal except when operating in the sleep mode. When the operation mode is the normal mode, the first beacon signal broadcast by the moving tag 1000 may include tag-dedicated information. When the moving tag 1000 approaches the beacon scanner 2000, the beacon scanner 2000 may scan the first beacon signal to detect the approach of the moving tag 1000.

Then, when the beacon scanner 2000 determines that the moving tag 1000 enters within a predetermined range based on the reception signal intensity of the first beacon signal, the beacon scanner 2000 generates a trigger to request the moving tag 1000 to switch the operation mode from the normal mode to the active mode. The moving tag 1000 switches the operation mode into the active mode at the request of the beacon scanner 2000, and the moving tag 1000 switched into the active mode broadcasts the second beacon signal. The second beacon signal includes location information and tag-dedicated information of the moving tag 1000 determined on the basis of the scanner signal, and the beacon scanner 2000 having scanned the second beacon signal then transmits the location information of the moving tag 1000 to the service server 3000. When predetermined criteria are satisfied as needed, the moving tag 1000 that operates while switching the sleep mode, the normal mode, and the active mode as described above switches the operation mode and transmits the signal only when needed, so that power consumption can be minimized. The moving tag 1000 operating in the general mode may switch the operation mode as described with reference to FIGS. 6 and 7 described later. More details will be described later.

Figure 6:
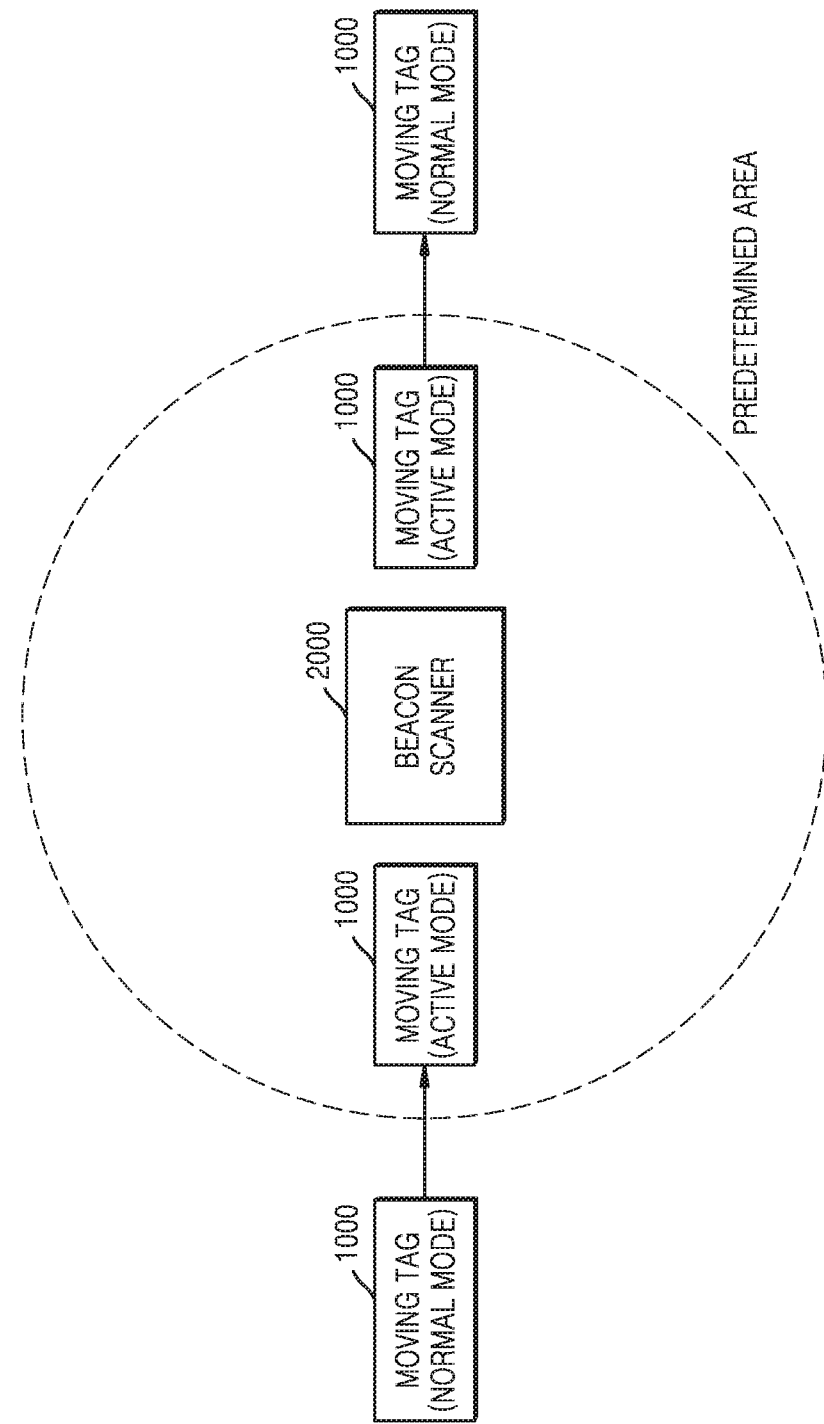
FIG. 6 is a view schematically showing a process of switching a mode of a moving tag from a normal mode to an active mode according to one embodiment of the present invention.

FIG. 6 schematically shows a switching process from the normal mode to the active mode of a moving tag 1000 according to one embodiment of the present invention.

The moving tag 1000 may switch the operation mode according to a movement of a user who carries the moving tag 1000. As shown in FIG. 6, the moving tag 1000 operating in the normal mode is in a state of being moved by the user. The moving tag 1000 operating in the normal mode broadcasts a first beacon signal including tag-dedicated information of the moving tag 1000. As shown in FIG. 6, when the moving tag 1000 operating in the normal mode enters a predetermined area of the beacon scanner 2000, the moving tag 1000 receives a mode switching request from the trigger module 2400 of the beacon scanner 2000 and converts the operation mode into the active mode. The entry to the predetermined area may be determined based on the signal reception intensity of the first beacon signal broadcast by the moving tag 1000. When the moving tag is closer within a predetermined distance, the reception intensity of the beacon signal becomes stronger. Based on the above reception intensity of the beacon signal, the beacon scanner 2000 may determine whether the moving tag 1000 enters or leaves the predetermined area.

The moving tag 1000 that enters within the predetermined area of the beacon scanner 2000 maintains the operation of the active mode when moving only within the predetermined area.

Then, when the moving tag 1000 moves and leaves the predetermined area of the beacon scanner 2000, the moving tag 1000 switches the operation of the active mode into the operation of the normal mode. When the moving tag 1000 leaves the predetermined area and a predetermined time elapses, the operation of the active mode is switched into the operation of the normal mode.

The operation mode from the normal mode to the active mode of the moving tag 1000 may be switched on the basis of a trigger generated between the beacon scanner 2000 and the moving tag 1000.

Figure 7:
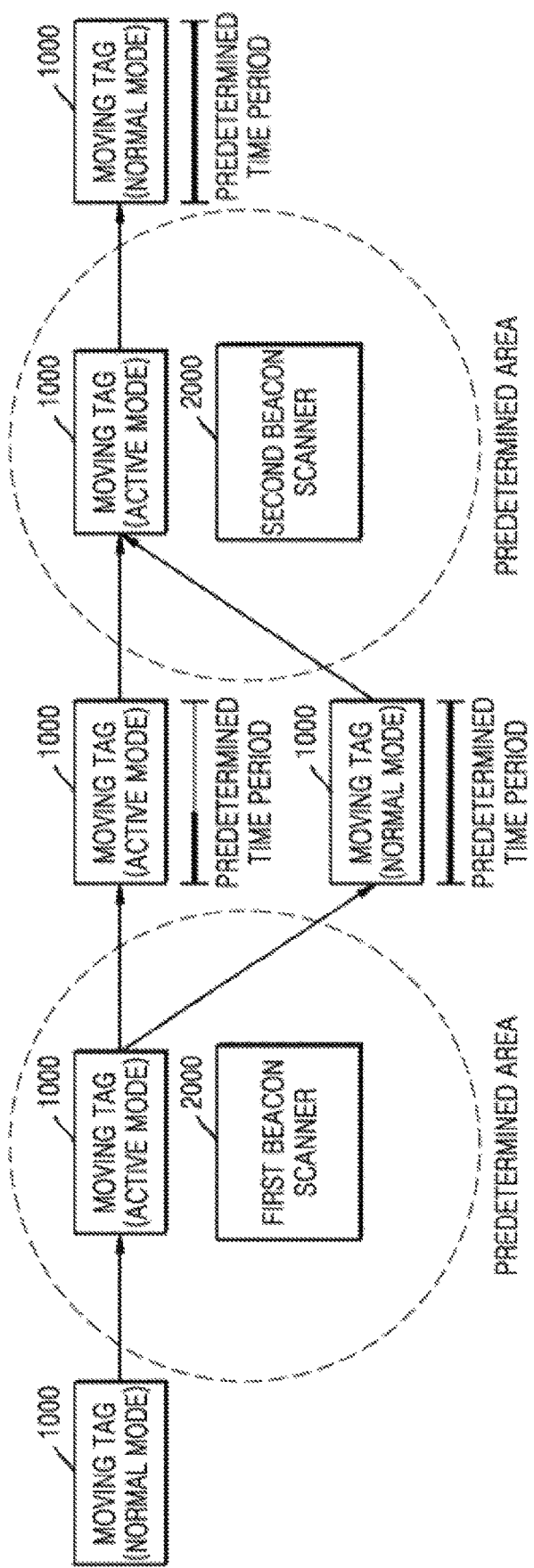
FIG. 7 is a view schematically showing a switching process between a normal mode and an active mode, based on an elapsed time, of a moving tag according to one embodiment of the present invention.

FIG. 7 schematically shows a switching process, based on the elapsed time, between the normal mode and the active mode of the moving tag 1000 according to one embodiment of the present invention.

In addition, the moving tag 1000 may switch the operation mode differently according to the time elapsed after the entry of the predetermined area. As shown in FIG. 7, when the moving tag 1000 operating in the normal mode enters a predetermined area of the first beacon scanner 2000, the general mode module 1200 of the moving tag 1000 receives a mode switching request transmitted by the beacon scanner 2000, and switches the operation of the normal mode into the operation of the active mode. In addition, when moving only within a predetermined area of the first beacon scanner 2000, the moving tag 1000 maintains the operation of the active mode.

Then, when leaving the predetermined area of the first beacon scanner 2000 according to the movement of the user, the moving tag 1000 switches the operation mode differently according to elapsed time. As shown in FIG. 7, when the moving tag 1000 has left the predetermined area of the first beacon scanner 2000 but a predetermined time has not elapsed, the active mode continues to operate without being switched into the operation of the normal mode. However, when the predetermined time elapses after leaving the predetermined area of the first beacon scanner 2000, the operation mode of the moving tag 1000 is switched from the active mode to the normal mode.

The entry to the predetermined area may be determined based on the signal reception intensity of the first beacon signal broadcast by the moving tag 1000. When the moving tag is closer within a predetermined distance, the signal reception intensity of the beacon signal becomes stronger. Based on the above signal reception intensity of the beacon signal, the beacon scanner 2000 may determine whether the moving tag 1000 enters or leaves the predetermined area.

Then, when the moving tag 1000 maintaining the active mode enters the predetermined area of the second beacon scanner 2000 before the predetermined time elapses as shown in FIG. 7, the active mode is maintained. When entering the predetermined area of the second beacon scanner 2000, the moving tag 1000 that has been switched into the operation of the normal mode after the predetermined time elapses receives the mode switching request of the second beacon scanner 2000 again and switches the operation mode of the moving tag 1000 from the normal mode to the active mode. When the moving tag 1000 moves only within the predetermined area of the second beacon scanner 2000, the moving tag 1000 maintains the active mode. Then, when a predetermined time elapses after the second beacon scanner 2000 deviates from the predetermined area according to the movement of the user, the moving tag 1000 switches the operation mode from the active mode to the normal mode.

Accordingly, the moving tag 1000 does not repeatedly execute unnecessary mode switching by maintaining or switching the operation mode according to the lapse of the predetermined time, and switches the operation mode according to the preset criteria, so that the battery power consumption can be reduced.

Figure 8:
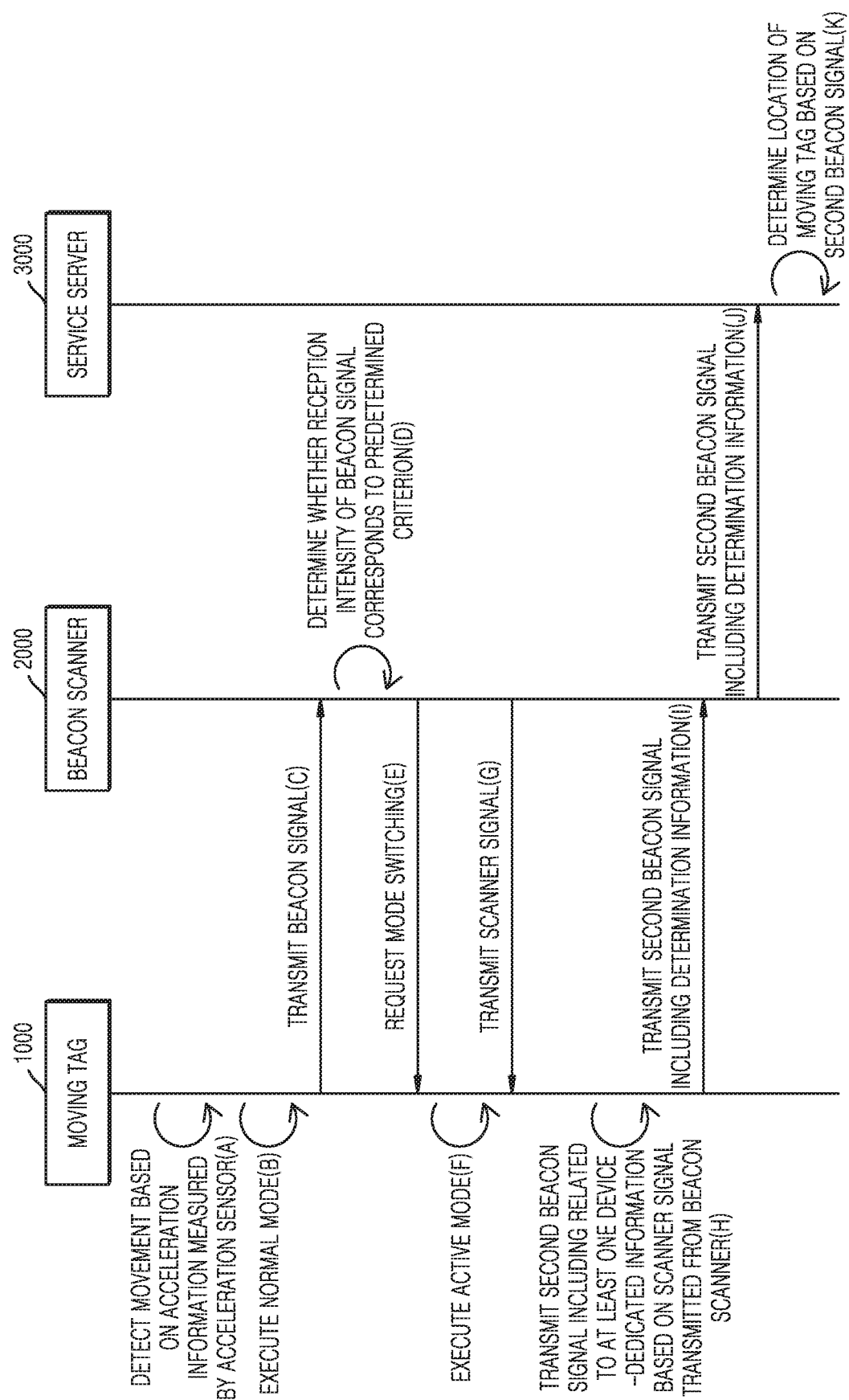
FIG. 8 is a view schematically showing a process of processing beacon signals according to a mode switching process of a moving tag according to one embodiment of the present invention.

FIG. 8 schematically shows a process of processing beacon signals transmitted from the moving tag 1000 and the beacon scanner 2000 according to one embodiment of the present invention.

The moving tag 1000 may operate in one of the sleep mode, the normal mode, and the active mode as described above, and may receive the scanner signal and transmit the beacon signal.

Specifically, in step (A), the moving tag 1000 detects a movement based on the acceleration information measured by the acceleration sensor. When there is no movement, the operation mode of the moving tag 1000 operates in the sleep mode in which the scanner signal is not scanned and the beacon signal is not broadcast.

In step (B), when the movement is detected based on the acceleration information, the moving tag 1000 switches the operation mode from the sleep mode to the normal mode.

In step (C), the moving tag 1000 in the normal mode broadcasts the first beacon signal.

In step (D), the beacon scanner 2000 determines whether the signal reception intensity of the scanned first beacon signal satisfies a predetermined criterion.

In step (E), when the signal reception intensity of the first beacon signal satisfies the predetermined criterion, the beacon scanner 2000 requests the switching of the operation mode by generating a trigger to the moving tag 1000.

In step (F), the moving tag 1000 receiving the request for switching the operation mode of the beacon scanner 2000 switches the operation mode from the normal mode to the active mode.

In step (G), the beacon scanner 2000 transmits the scanner signal to the moving tag 1000. The beacon scanner 2000 may broadcast the scanner signal repeatedly regardless of the operation mode of the moving tag 1000.

In step (H), the moving tag 1000 operating in the active mode scans the scanner signal broadcast by the beacon scanner 2000. The determination information related to at least one device-dedicated information is extracted on the basis of the scanned scanner signal. The determination information may denote information related to device-dedicated information of the beacon scanner 2000 that has transmitted the scanner signal having the highest signal reception intensity in the moving tag 1000.

In step (I), the moving tag 1000 broadcasts the second beacon signal including the determination information and the tag-dedicated unique information.

In step (J), the beacon scanner 2000 that scanned the second beacon signal transmits the determination information and the tag-dedicated information to the service server 3000.

In step (K), the location of the moving tag 1000 is determined based on the determination information and the tag-dedicated information and the device-dedicated information of the beacon scanner 2000. In addition, the entry to or exit from the location may be determined.

Accordingly, the moving tag 1000 switches the operation mode, and transmits the signal only when a signal transmission is necessary, so that the power consumption can be minimized. In addition, the moving tag 1000 directly extracts and transmits determination information related to the device-dedicated information of the beacon scanner 2000 to which the moving tag 1000 is adjacent based on the scanner signal, an overload, which occurs in a processor when a plurality of raw data are required to be processed in the beacon scanner 2000, can be prevented and improved.

Figure 9:
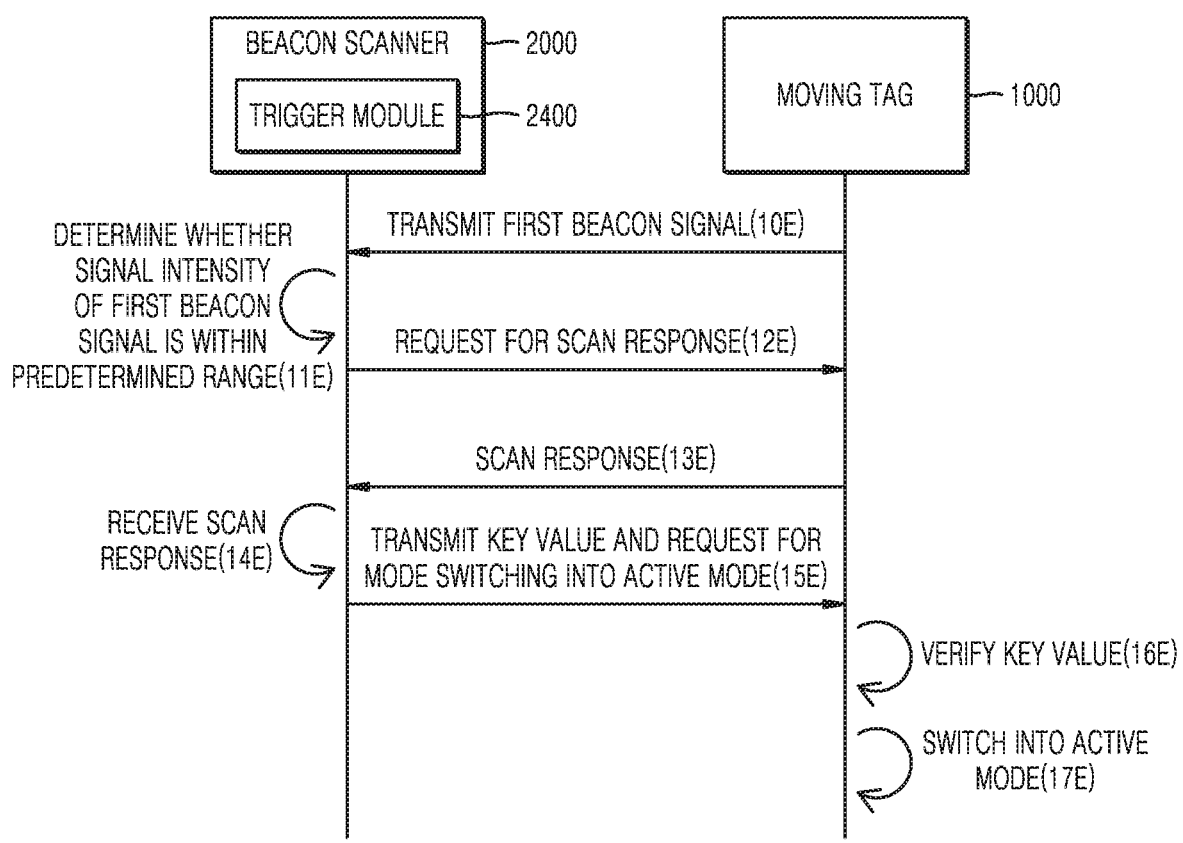
FIG. 9 is a view schematically showing a data transmission/reception process using the conventional Bluetooth connection according to one embodiment of the present invention.

FIG. 9 schematically shows a process of processing beacon signals according to a mode switching process of the moving tag 1000 according to one embodiment of the present invention.

As described above, when the moving tag 1000 enters a predetermined area of an adjacent beacon scanner 2000, the moving tag 1000 receives a switching request of the operation mode of the moving tag 1000 from the normal mode to the active mode. FIG. 9 schematically shows the process in which the beacon scanner 2000 requests the moving tag 1000 to switch the mode.

Specifically, in step 10e, the moving tag 1000 operating in the normal mode repeatedly transmits the first beacon signal.

In step 11e, the beacon scanner 2000 that receives the first beacon signal transmitted by the moving tag 1000 determines whether the reception intensity of the first beacon signal is within a predetermined range. The beacon scanner 2000 may determine whether the moving tag 1000 enters the predetermined area based on the reception intensity of the first beacon signal.

In step 12e, the beacon scanner 2000 requests a scan response to the moving tag 1000 when the moving tag 1000 enters the predetermined area of the beacon scanner 2000 in step 11e. When the moving tag 1000 enters the predetermined area, the beacon scanner 2000 requests the scan response to the moving tag 1000 to request the moving tag 1000 to switch the operation mode.

In step 13e, the moving tag 1000 receives the scan response request from the beacon scanner 2000 and transmits a scan response for the scan response request.

In step 14e, the beacon scanner 2000 receives the scan response from the moving tag 1000.

In step 15e, the beacon scanner 2000 requests the moving tag 1000 to switch the mode into the active mode, while transmitting a key value to the moving tag 1000 that has transmitted the scan response. The beacon scanner 2000 requests to switch the operation mode of the moving tag 1000 into the active mode while transmitting the key value to enable a connection for wireless communication with the moving tag 1000.

In step 16e, the moving tag 1000 performs a procedure for verifying whether the key value received from the beacon scanner 2000 is a valid key value.

In step 17e, the moving tag 1000 switches the operation mode from the normal mode to the active mode when the key value is verified to be valid.

After the moving tag 1000 verifies the key value, the Bluetooth connection is performed between the beacon scanner 2000 and the moving tag 1000. In the mode switching request from the normal mode to the active mode, the mode switching request is performed by immediately disconnecting the completed connection after completing the connection between the beacon scanner 2000 and the moving tag 1000. The moving tag 1000 recognizes that the mode is required to be switched when the connection is immediately disconnected after being connected to the beacon scanner 2000, and thus the moving tag 1000 switches the operation mode from the normal mode to the active mode.

Figure 10:
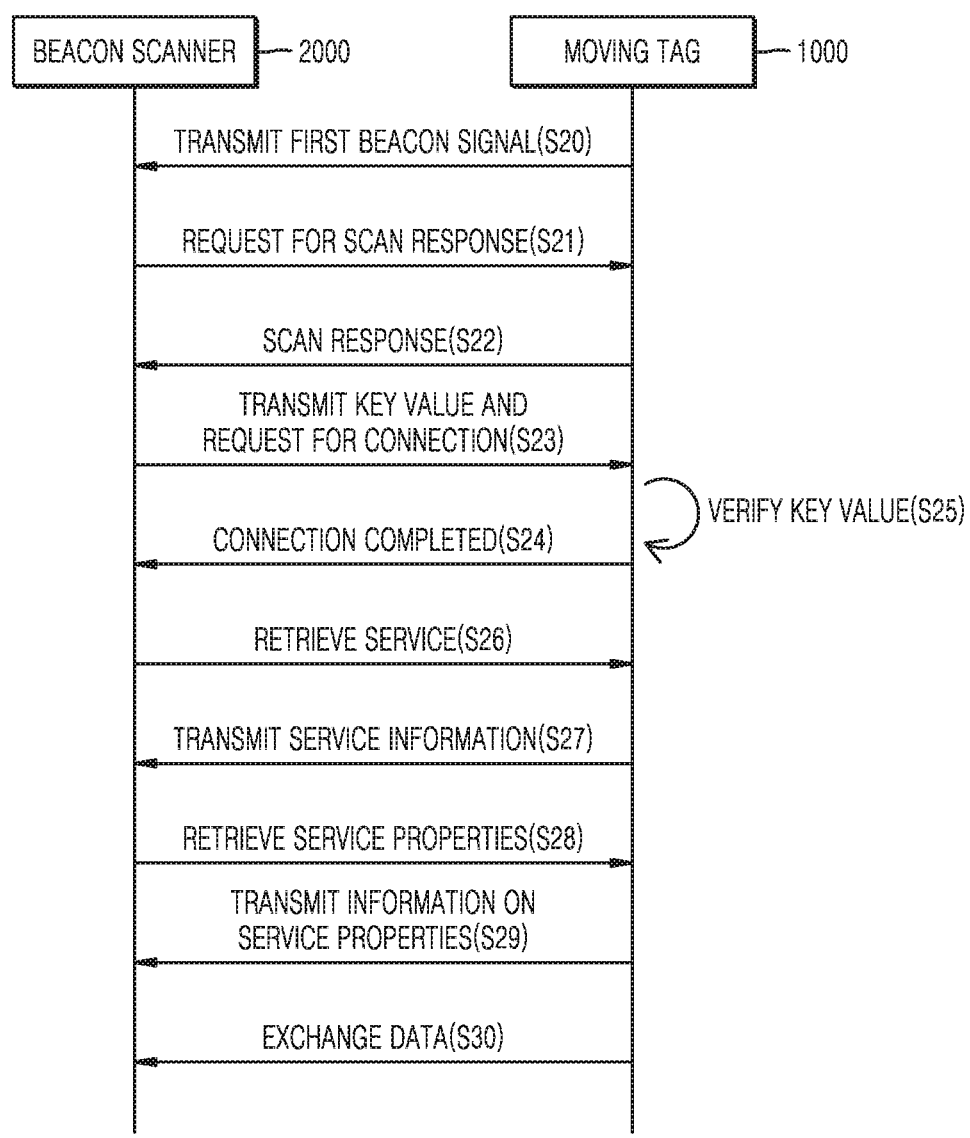
FIG. 10 is a view schematically showing a process of processing beacon signals transmitted from a moving tag and a beacon scanner according to one embodiment of the present invention.

FIG. 10 schematically shows Bluetooth connection process and a data transmission/reception process according to one embodiment of the present invention.

The connection process with the moving tag 1000 performed by the trigger module 2400 of the beacon scanner 2000 is different from the conventional Bluetooth connection process. FIG. 10 shows a data transmission/reception process when the beacon scanner 2000 and the moving tag 1000 perform the conventional Bluetooth connection process.

Specifically, in step S20, the moving tag 1000 repeatedly transmits the first beacon signal.

In step S21, the beacon scanner 2000 that receives the first beacon signal transmitted by the moving tag 1000 requests a scan response from the moving tag 1000.

In step S22, the moving tag 1000 that receives the scan response request transmits the scan response to the beacon scanner 2000.

In step S23, the beacon scanner 2000 that receives the scan response requests a device connection while transmitting a key value to the moving tag 1000.

In step S24, the moving tag 1000 that receives the key value performs a key value verification to determine whether the key value is valid.

In step S25, when the key value is determined as valid after key value verification is performed, the connection between the beacon scanner 2000 and the moving tag 1000 is completed.

In step S26, the beacon scanner 2000 retrieves a service from the connected moving tag 1000.

In step S27, the moving tag 1000 transmits information on the service of the moving tag 1000 retrieved by the beacon scanner 2000.

In step S28, the beacon scanner 2000 receives information on the service and retrieves characteristics of the service.

In step S29, the moving tag 1000 transmits information on the characteristics of the service retrieved by the beacon scanner 2000.

In step S30, the beacon scanner 2000 and the moving tag 1000 may exchange necessary data with each other.

Accordingly, in the conventional Bluetooth connection, when the beacon scanner 2000 requests the moving tag 1000 to switch the operation mode, all steps S20 to S30 are performed, and data for requesting the mode switching is exchanged in step S30, so that the switching the operation mode may be requested. The above scheme takes a long time from the connection to the data exchange. Accordingly, according to the present invention, an immediate disconnection, after the beacon scanner 2000 performs the step S24 of requesting the connection with the moving tag 1000 and the step S25 of completing the connection, is defined as a trigger for requesting the switching of the operation mode of the moving tag 1000, and the moving tag 1000 performs the mode switching according to whether the trigger is generated. Step 15*e* may be the same as disconnecting the device after performing steps S24 and S25. The beacon scanner 2000 and the moving tag 1000 reduce unnecessary communication by operating in the above manner, so that the battery power consumption can be minimized and the communication can be performed faster.

Figure 11:
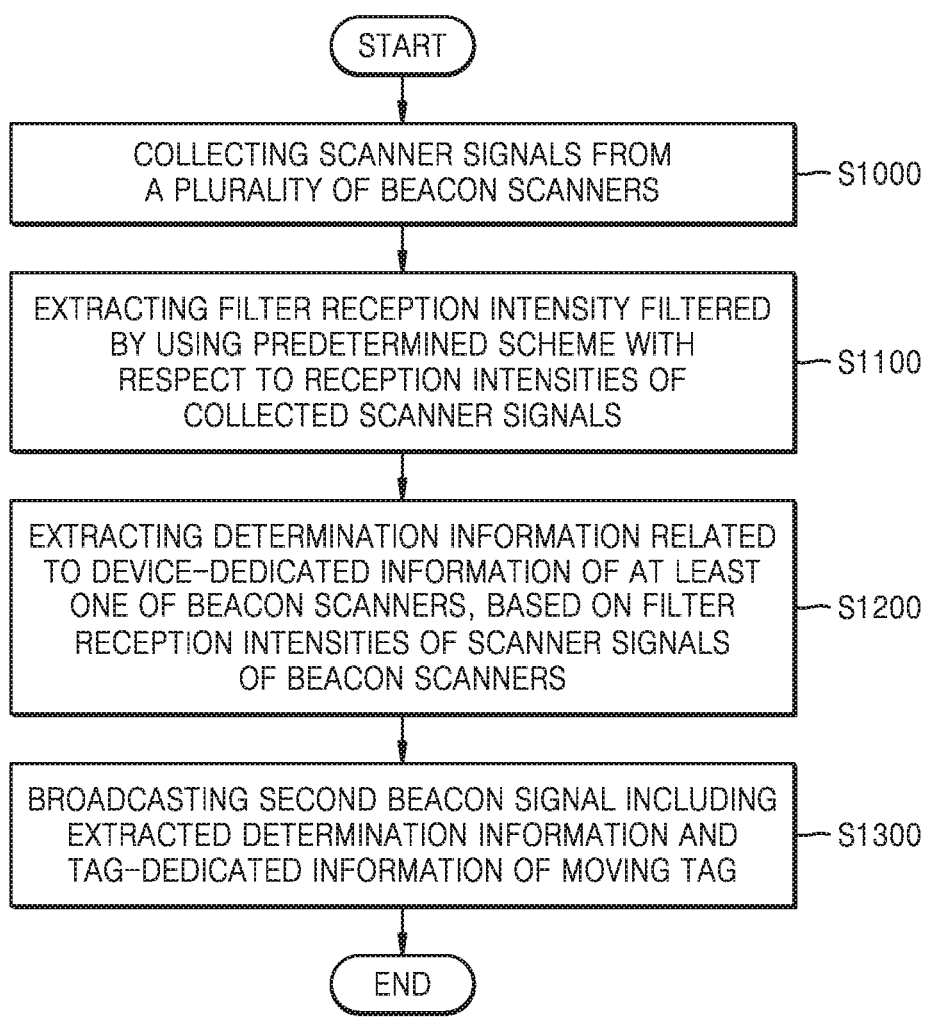
FIG. 11 is a view schematically showing performing steps of a moving tag according to one embodiment of the present invention.

FIG. 11 schematically shows performing steps of the moving tag 1000 according to one embodiment of the present invention.

The moving tag 1000 performs: a signal collecting step S1000 of collecting scanner signals transmitted from the beacon scanners; a signal filtering step S1100 of extracting a filter reception intensity filtered using a predetermined scheme with respect to reception intensity of the collected scanner signals; a determination step S1200 of extracting determination information related to device-dedicated information of at least one among the beacon scanners, based on a plurality of filter reception intensities of the scanner signals of the beacon scanners 2000; and a broadcasting step S1300 of broadcasting the second beacon signal;

Specifically, in the signal collecting step S1000, the moving tag 1000 collects a scanner signal from the beacon scanners 2000. The moving tag 1000 may be in a state of operating the active mode. The system for determining the location of the moving tag of the present invention may include at least two beacon scanners 2000 and at least one moving tag 1000 depending on a structure of a building or space installed with the system, and each moving tag 1000 and each beacon scanner 2000 may broadcast each scanner signal and each beacon signal, respectively. The moving tag 1000 collects the scanner signal broadcast by each of the beacon scanners 2000.

In the signal filtering step S1100, the moving tag 1000 extracts the filter reception intensity filtered in the predetermined manner with respect to the reception intensity of the collected scanner signal. Herein, since the scanner signal broadcast by the beacon scanner 2000 communicates in a high frequency band of 2.4 GHz, it is difficult to extract accurate data without filtering. The moving tag 1000 filters all of the collected scanner signals by using the predetermined manner with respect to the reception intensities of the signals.

Specifically, the signal filtering step S1100 may include: a primary filter step of removing noise based on the received at least one scanner signal; and a secondary filter step of extracting an average value based on at least one scanner signal that have passed the primary filter step.

In one embodiment of the invention, the reception intensity of the signal may be filtered based on the Kalman filter in the primary filter step. The Kalman filter is a filter configured to extract a new future prediction value by calculating a predictor variable based on the most recent data value, and convert the predictor variable into a predictor variable reflecting the future prediction value. When there is a small amount of data to be processed, a method of storing and calculating both of the collected data and the filtered data may be used. However, when the amount of data is large and an iterative operation is required, a future value is predicted by using the Kalman filter, so that the optimal value for necessary information can be obtained without accumulating vast amounts of data.

In the second filter stage, an average value is extracted by summing up a plurality of scanner signals broadcast from the same beacon scanner 2000 among the signals that have passed the first filter step. The scanner signal includes device-dedicated information of the beacon scanner 2000. The average value of the scanner signal broadcast from the same beacon scanner 2000 is extracted as the filter reception intensity, based on the device-dedicated information of the beacon scanner 2000 included in the scanner signal.

In the second filter step, a weighted average value for each signal based on the reception signal intensity may be extracted as the filter reception intensity.

In the determination step S1200, the moving tag 1000 extracts the determination information related to device-dedicated information of at least one among the beacon scanners 2000, based on a plurality of filter reception intensities of the scanner signals of the beacon scanners 2000 The determination information includes information related to device-dedicated information of a beacon scanner 2000 that transmits a scanner signal having a highest reception intensity in the moving tag among the scanner signals 1000. In one embodiment of the present invention, a plurality of beacon scanners 2000 includes at least one transmission module, and a plurality of scanner signals are broadcast from the at least one transmission module. Accordingly, the number of scanner signals scanned by the moving tag 1000 may correspond to the number of all scanners 2000 installed in the space x the number of transmission modules included in the beacon scanner 2000. As the number of installed beacon scanners 2000 increases, the scanner signal scanned by the moving tag 1000 also increases. In order to distinguish multiple scanner signals, the scanner signal is broadcast while including information related to the device-dedicated information of the beacon scanner 2000. The moving tag 1000 may extract determination information for knowing a beacon scanner 2000 to which the moving tag 1000 is currently closest, based on the device-dedicated information of the beacon scanner 2000. The detailed method of extracting the determination information will be described later.

In broadcasting step S1300, the moving tag 1000 broadcasts a second beacon signal. The second beacon signal broadcast by the moving tag 1000 includes determination information related to device-dedicated information of at least one among the beacon scanners 2000, and tag-dedicated information of the moving tag 1000.

The moving tag 1000 may transmit the second beacon signal to the beacon scanner 2000 and the beacon scanner 2000 may transmit the received second beacon signal to the service server 3000 through the gateway 2500. Processing for recognition of the moving tag 1000 is performed by the reception module 2300 of the beacon scanner 2000. The gateway 2500 transmits the received location information of the moving tag 1000, preferably, the determination information including information on a door number and an inside-outside of the moving tag 1000, to the service server 3000.

FIGS. 12A and 12B schematically show a packet configuration of data transmitted from the beacon scanner 2000 according to one embodiment of the present invention.

The transmission module of the beacon scanner 2000 repeatedly broadcasts the data packet as shown in FIGS. 12A and 12B. In one embodiment of the present invention the data packet broadcast by the transmission module of the beacon scanner 2000 may include an equipment type, a door number, an access type, other information, a major value, and a minor value.

The device-dedicated information of the beacon scanner 2000 and the tag-dedicated information of the moving tag 1000 may be, for example, types of equipment illustrated in FIGS. 12A and 12B. When 0x01 or 0x02 is preset as a number for identifying the beacon scanner 2000, and when the equipment type of the received data packet is 0x01 or 0x02, the signal may be determined to be transmitted from the beacon scanner 2000. The type of equipment such as the beacon scanner 2000 or the moving tag 1000 may be distinguished in the above manner. In addition, a unique number is given for each door installed with the beacon scanner 2000, so that a door number for entering and exiting can be distinguished.

In addition, the major and minor values may be data for distinguishing the transmission module of the beacon scanner 2000. FIG. 12A shows a data packet transmitted by the first transmission module 2100 of the beacon scanner 2000. FIG. 12B shows a data packet transmitted by the second transmission module 2200 of the beacon scanner 2000. When the major value is 0x0100, the packet may be classified into a packet transmitted from the first transmission module 2100. When the major value is 0x0200, the packet may be classified into a packet transmitted from the second transmission module 2200.

The above data packet may be received when the operation mode of the moving tag 1000 is the active mode.

FIGS. 13A and 13B schematically show a packet configuration of data transmitted from the moving tag 1000 according to one embodiment of the present invention.

The moving tag 1000 may repeatedly broadcast a data packet as shown in FIGS. 13A and 13B. Specifically, when the operation mode of the moving tag 1000 is the sleep mode, the moving tag 1000 does not transmit nor receive data. When the operation mode of the moving tag 1000 is the normal mode, the data packet as shown in FIG. 13A is repeatedly broadcast. Compared with the data packet shown in FIGS. 12A and 12B, it is indicated that the equipment type is differently shown as 0x04. In one embodiment of the present invention, it can be seen that 0x01 is classified as the beacon scanner 2000 and 0x04 is classified as the moving tag 1000.

Meanwhile, when the moving tag 1000 operates in the normal mode, the data packet is broadcast as a default value (0x00) with respect to a door number and an access type. When the operation mode of the moving tag 1000 is the normal mode, since the scanner signal of the beacon scanner 2000 cannot be received, the determination information for determining the location of the moving tag 1000 cannot be extracted. Thus, the packet for the door number and the access type that are information on the location of the moving tag 1000 cannot be generated. Accordingly, in the normal mode, since the signal broadcast by the moving tag 1000 is repeatedly transmitted to allow the beacon scanner 2000 to detect the moving tag 1000, the door number and the access type of the data packet may be transmitted/received as a default value that is preset by the administrator.

FIG. 13B shows a data packet type of the broadcasting second beacon signal, when the operation mode of the moving tag 1000 is the active mode. Compared with FIG. 13A, it is shown that the door number and the access type are differently indicated although other categories are the same. When the operation mode of the moving tag 1000 is the active mode, the moving tag 1000 may receive a scanner signal transmitted by the beacon scanner 2000. In addition, the moving tag 1000 having received the scanner signal may broadcast the second beacon signal, which includes determination information related to device-dedicated information of at least one among the beacon scanners 2000, in the form of data packet as shown in FIG. 13B based on the scanner signal. The door number and the access type may be included in the determination information. Then, the beacon scanner 2000 having received the data packet as shown in FIG. 13B may communicate with the service server 3000 through the gateway 2500, thereby transmitting the determination information and the tag-dedicated information included in the second beacon signal.

Figure 14:
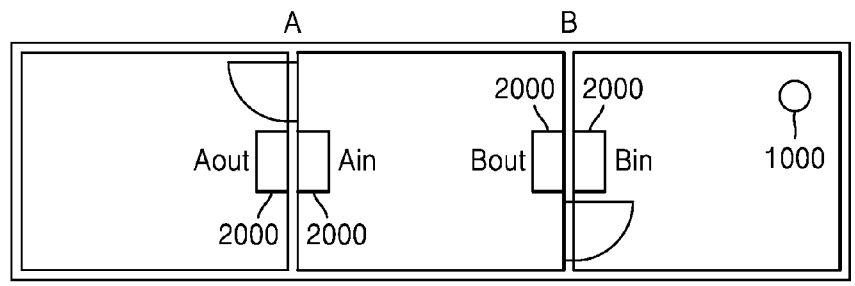
FIGS. 14A-14C are views schematically showing a format of data filtered according to signal filtering step of a moving tag according to one embodiment of the present invention.
Figure 14:
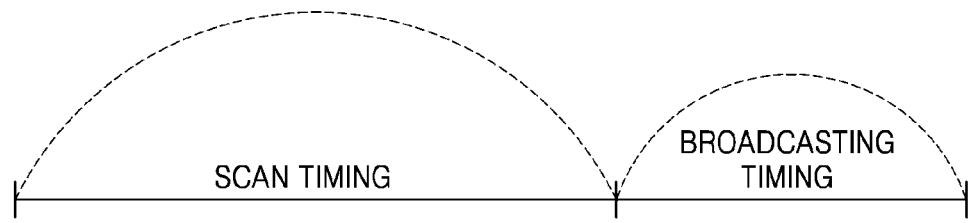
Figure 14:
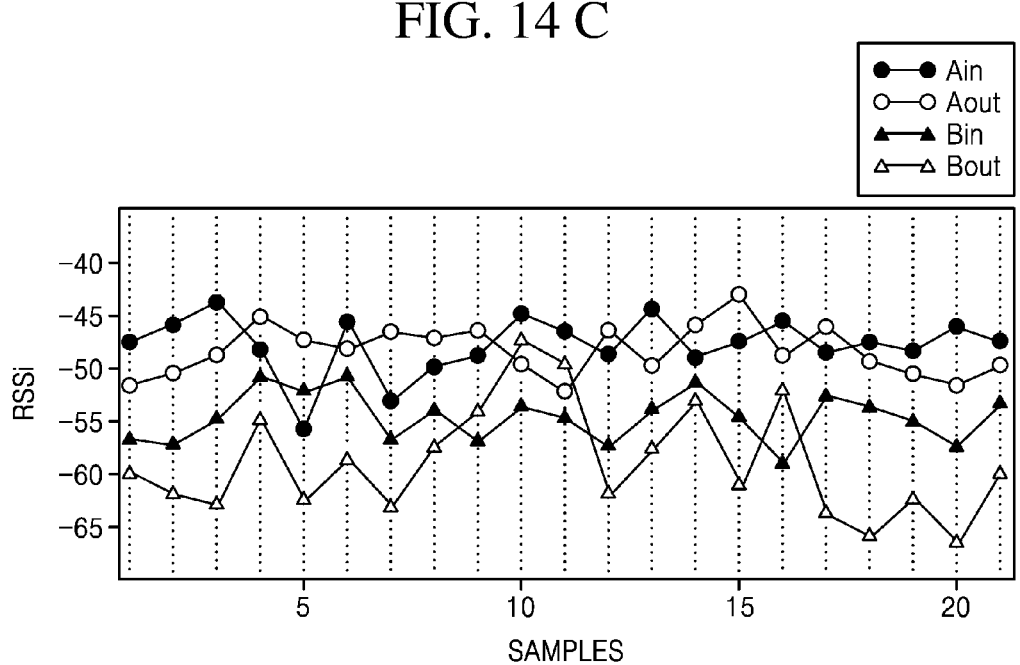

FIGS. 14A-14C schematically show a process of processing a plurality of scanner signals collected by the moving tag 1000 according to one embodiment of the present invention. The moving tag 1000 collects a plurality of scanner signals from a plurality of beacon scanners 2000 by performing the signal collecting step S1000. The signal intensity of the collected scanner signals may vary depending on the location of the moving tag 1000.

FIG. 14A shows that four beacon scanners Ain, Aout, Bin, and Bout are installed in a plurality of room structures. The moving tag 1000 receives a scanner signal from each beacon scanner 2000, and the reception intensities of the scanner signals are received differently according to the location of the moving tag 1000.

As shown in FIG. 14B, while the operation mode of the moving tag 1000 operates in the active mode, the moving tag 1000 may be subject to a scan timing and a broadcasting timing so that moving tag 1000 may operate in a section for scanning only and a section for broadcasting only. The moving tag 1000 scans a plurality of scanner signals during the scan timing. The moving tag 1000 during the scan timing continuously performs a signal filtering step on the received scanner signals to extract the filtered filter reception intensity. Then, the filter reception intensities among the received scanner signals are summed for each beacon scanner 2000; the beacon scanner 2000 that broadcasts the signal having the largest sum of the filter reception intensities is determined as the beacon scanner 2000 that is closest to the current location of the moving tag 1000; and the determination information, which includes information related to the device-dedicated information of the beacon scanner 2000 that transmits the scanner signal having the highest reception intensity, is extracted. Periods of the scan timing and the broadcasting timing may be preset as periods most suitable for data processing.

FIG. 14C shows a graph indicating the filtered filter reception intensity of the scanner signal scanned by the moving tag 1000 during the scan timing. The moving tag 1000 filters the scanner signal scanned during the scan timing through the signal filtering step, compares the filtered filter reception intensities, determines the signal having the largest signal intensity as the beacon scanner 2000 currently closest to the moving tag 1000, and extracts the determination information including information related to the device-dedicated information of the beacon scanner 2000. For example, referring to FIG. 14C, the fifth-received filter reception intensity of the scanner signals is the strongest filter reception intensity of the beacon scanner 2000 received from the Ain beacon scanner 2000. In this case, the determination information may be extracted on the basis that the location of the moving tag 1000 is close to Ain.

Figure 15:
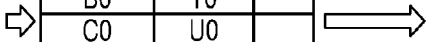
FIGS. 15A-15C are views schematically showing a process of processing a plurality of beacon signals collected when a moving tag performs according to one embodiment of the present invention.
Figure 15:
Figure 15:

FIGS. 15A-15C schematically show the format of the data filtered according to the signal filtering step of the moving tag 1000 according to one embodiment of the present invention.

Specifically, the moving tag 1000 may store filtered filter reception intensity determined in the previous step and a predictor variable determined in the previous step, with respect to each scanner signal broadcast from each beacon scanner 2000, and may update the signal intensity of the scanner signal received at a current step, the filtered filter reception intensity determined in the previous step, and filter reception intensity and a predictor variable filtered on a basis of the predictor variable determined in the previous step.

More specifically, in the first filter step included in the signal filtering step the filter reception intensity may be extracted based on the Kalman filter. The Kalman filter is a filter configured to extract a new future prediction value by calculating a predictor variable based on the most recent data value, and convert the predictor variable into a predictor variable reflecting the future prediction value. When there is a small amount of data to process, a method of storing and calculating both of the collected data and the filtered data may be used. However, when the amount of data is large and an iterative operation is required, a future value may be predicted by using the Kalman filter, so that the optimal value for necessary information can be obtained without accumulating vast amounts of data.

The moving tag 1000 may update the signal intensity of the scanner signal received at a current step, the filtered filter reception intensity determined in the previous step, and filter reception intensity and a predictor variable filtered on a basis of the predictor variable determined in the previous step.

FIGS. 15A-15C show a table for explaining the format of data filtered in the signal filtering step. As shown in FIG. 15A, the filtered filter reception intensity determined in the previous step and the predictor variable determined in the previous step are stored. Then, when the scanner signal a1 is received at the current step, the signal intensity of the scanner signal a1 is filtered and extracted as A1, based on a filtered signal intensity A0 determined in the previous step and a predictor variable S0 determined in the previous step. The filtered and currently received scanner signal A1 is again updated with the filtered signal intensity determined in the previous step, and the predictor variable is also updated to S1 based on the signal intensity A1 of the currently received scanner signal. Since the scanner signals are received simultaneously, each scanner signal may be filtered and updated in real time, based on the filtered filter reception intensity determined in the previous step and the predictor variable determined in the previous step, even when a plurality of scanner signals are received as shown in FIG. 15B.

In addition, according to one embodiment of the present invention, the Kalman filter algorithm used in the signal filtering step may determine that excessively old data is invalid and delete the data.

Referring to FIG. 15C, the data corresponding to the filtered filter reception intensity D0, F0 and H0 determined in the previous step has been lapsed for a long time from the update of the value that is filtered by receiving the scanner signal as compared with other data. The moving tag 1000 may determine that the data is not valid and may delete the data. Accordingly, since the future value is predicted based on the preceding data value in the signal filtering step, invalid data may be deleted so that more accurate prediction value can be extracted. Thus, the desired result can be extracted based on two values of preceding final data and the future predictor variable without accumulating all the preceding data.

FIGS. 16A-16D schematically show graphs indicating reception intensity filtered according to the signal filtering step with respect to a beacon signal received by the moving tag 1000 from the beacon scanner 2000 according to one embodiment of the present invention.

Specifically, FIGS. 16A-16D show graphs indicating the signal intensity of a scanner signal, by the moving tag 1000, received from each transmission module of two beacon scanners 2000 installed in the both directions on the wall.

Figure 16:
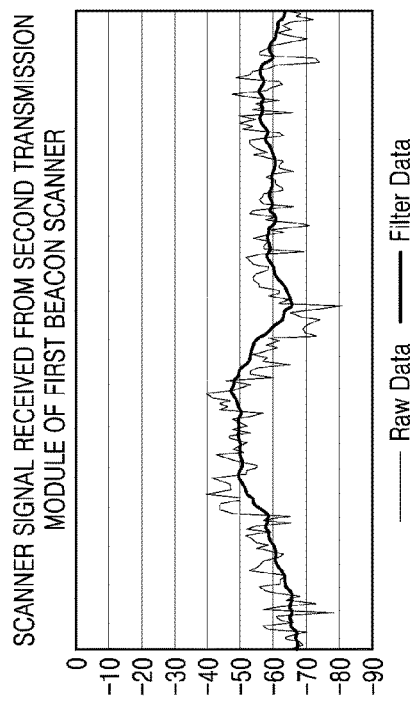
FIGS. 16A-16D are views schematically showing graphs indicating reception intensity filtered according to the signal filtering step with respect to a beacon signal received by a moving tag from a beacon scanner according to one embodiment of the present invention.
Figure 16:
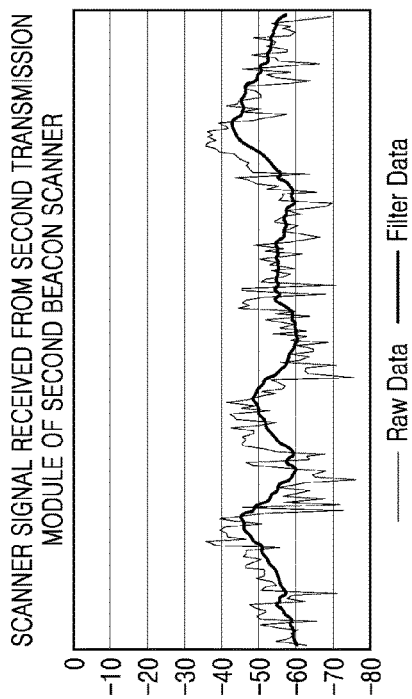
Figure 16:
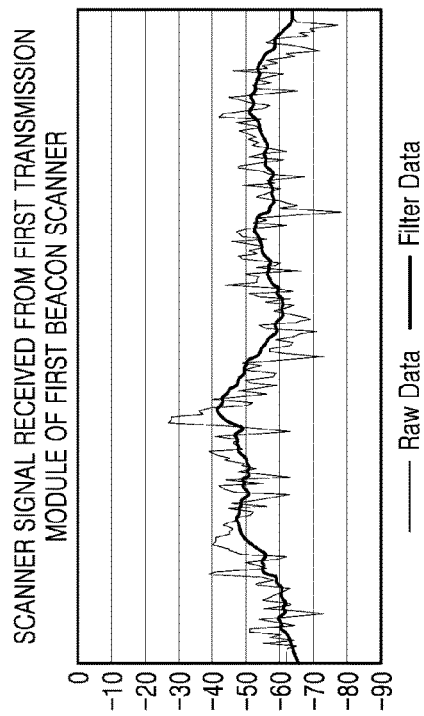
Figure 16:
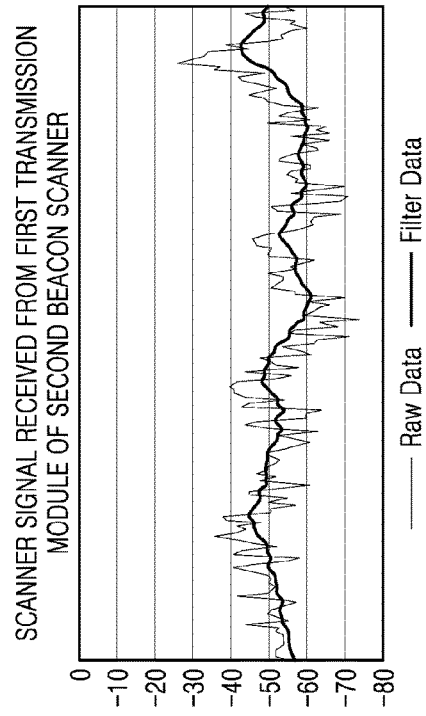

The moving tag 1000 receives a plurality of scanner signals from the beacon scanner 2000. According to one embodiment of the present invention, the beacon scanners 2000 installed bi-directionally on the wall broadcast a plurality of scanner signals through a first transmission module 2100 and a second transmission module 2200 of each beacon scanner 2000. At this time, the scanner installed outside the door around a wall is referred to as a first beacon scanner 2000, and the scanner installed inside the door is referred to as a second beacon scanner 2000. FIGS. 16(*a*) and 16(*b*) show graphs indicating values of reception intensities extracted by filtering the scanner signal received from the first beacon scanner 2000 by performing the first filter step, and FIGS. 16(*c*) and 16(*d*) show graphs indicating values of reception intensities extracted by filtering the scanner signal received from the second beacon scanner 2000. The moving tag 1000 filters all the scanned signals by performing the first filter step during the signal filtering step, almost as soon as the moving tag 1000 scans the scanner signal from the beacon scanner 2000 (exactly, very quickly after scanning). As shown in FIGS. 15A-15C, noises of the first beacon signal having passed through the first filter step are removed, so that data, which is valid for determining location information of the moving tag 1000, can be extracted.

FIG. 17 schematically shows a graph indicating a sum value extracted by summing up a filtered signal intensity value, which is extracted by performing the signal filtering step of the moving tag 1000, with respect to each beacon scanner 2000 according to one embodiment of the present invention.

FIG. 17 shows a graph indicating a sum of signal intensity values of the scanner signals transmitted from the first transmission module 2100 and the second transmission module 2200 of the same beacon scanner 2000, with respect to the scanner signal that has passed the first filter step in the moving tag 1000. FIG. 17(*a*) shows a graph indicating a sum of the filter reception intensities of the scanner signals received from a first transmission module 2100 and a second transmission module 2200 of the first beacon scanner 2000, and FIG. 17(*b*) shows a graph indicating a sum of the filter reception intensities of the scanner signals received from a first transmission module 2100 and a second transmission module 2200 of the second beacon scanner 2000. The moving tag 1000 performs a second filter step of summing up the scanner signals received from the same beacon scanner 2000 based on the filter reception intensity filtered through the first filter step. As the second filter step of the moving tag 1000 has been performed, the filter reception intensities of the scanner signals received from the first transmission module 2100 and the second transmission module 2200 of each beacon scanner 2000 are summed as shown in FIG. 17. The finally extracted summed filter reception intensity is then used as a basis for determining the location information of the moving tag 1000.

Figure 18:
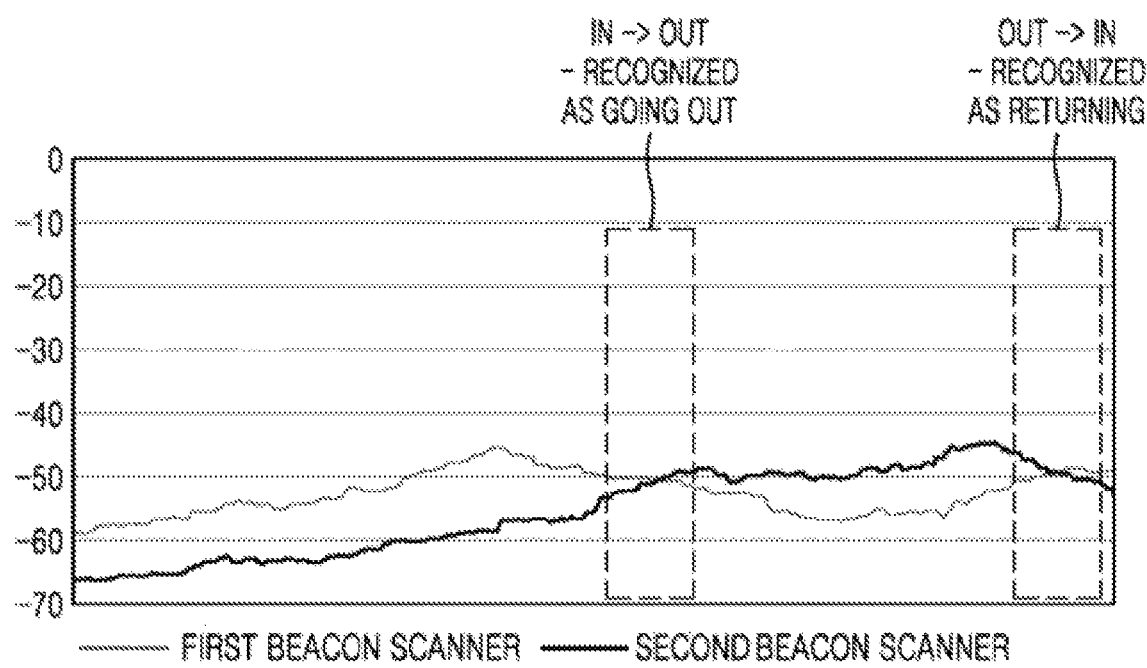
FIG. 18 is a view schematically showing a graph indicating a sum value extracted by summing up filtered signal intensities of a first beacon scanner and a second beacon scanner extracted by performing the signal filtering step of the moving tag according to one embodiment of the present invention.

FIG. 18 schematically shows a graph indicating a sum extracted by summing up filtered signal intensities of the first beacon scanner 2000 and the second beacon scanner 2000 extracted by performing the signal filtering step of the moving tag 1000 according to one embodiment of the present invention.

The moving tag 1000, which sums up the scanner signals received from the transmission modules of each beacon scanner 2000 through the second filter step, determines the beacon scanner 2000 closest to the moving tag based on the extracted sum of the filtered reception intensities. As shown in FIG. 18, the sum of the filter reception intensities of the first beacon scanner 2000 installed outside the door has been lower than the sum of the filter reception intensities of the second beacon scanner 2000 installed inside the door. At a sudden moment, the sum of the filter reception intensities of the first beacon scanner 2000 becomes higher than the sum of the filter reception intensities of the second beacon scanner 2000. Based on the above result, it is determined that the moving tag 1000 moves out of the door from an inner location of the door. Then, the sum of the filter reception intensities of the second beacon scanner 2000 has been lower than the sum of the filter reception intensities of the first beacon scanner 2000. At a sudden moment, the sum of the filter reception intensities of the second beacon scanner 2000 becomes higher than the sum of the filter reception intensities of the first beacon scanner 2000. Based on the above result, it can be determined that the moving tag 1000 moves into an inner side of the door from the outer location of the door. The determination information extracted in the above manner is transmitted to the beacon scanner 2000 together with the tag-dedicated information of the moving tag 1000, thereby serving as a basis for determining the location information of the moving tag 1000 in the service server 3000. The service server 3000 determines the entry and exit of the moving tag 1000 based on the information on the result value filtered and extracted by the moving tag 1000, so that the overload of data processing can be reduced.

In addition, one embodiment of the present invention may be implemented in the form of a recording medium containing instructions executable by a computer, such as a program module executed by the computer. The computer-readable media may be any available media that is accessible by the computer, and include a volatile or non-volatile media, and a removable or non-removable media. In addition, the computer-readable media may include a computer storage media and a communication media. The computer storage media include a volatile or non-volatile media, and a removable or non-removable media that are implemented by any method or technology for storing information such as computer readable instructions, data structures, program modules or other data. The communication media typically includes computer readable instructions, data structures, program modules, or other data of a modulated data signal such as a carrier wave, or other transmission mechanism, and includes any information delivery medium.

Although the method and system of the present invention have been described in connection with specific embodiments, some or all of components or operations thereof may be implemented using a computer system having a general hardware architecture.

The above description of the present invention is merely for illustration, and it will be apparent that a person having ordinary skill in the art may carry out various deformations and modifications within the scope without departing from the idea of the present invention, the following claims and equivalents thereof. Therefore, the above described embodiments should be understood in all respects as illustrative and not restrictive. For example, each component described as unitary may be implemented in a distributed manner. Likewise, components that are described as distributed may also be implemented in a combined form.

The scope of the invention is indicated by the following claims rather than the above detailed description, and all deformations or modifications extracted from the idea and scope of the claims and their equivalents should be construed as being included in the scope of the present invention.

What is claimed is:

1. A system for determining a location of a moving tag based on a radio signal, the system comprising:
   a plurality of beacon scanners configured to broadcast scanner signals including device-dedicated information; and
   a moving tag configured to receive the scanner signals from the beacon scanners and operate in an active mode configured to broadcast a second beacon signal based on received intensities of the scanner signals, wherein the second beacon signal includes determination information related to device-dedicated information of at least one of the beacon scanners, and tag-dedicated information of the moving tag,
   wherein the moving tag:
   stores filtered filter reception intensity determined in a previous step and a predictor variable determined in the previous step, with respect to each scanner signal received from each of the beacon scanners, and
   updates a signal intensity of a respective scanner signal received at a current step, the filtered filter reception intensity determined in the previous step, and filter reception intensity and a predictor variable filtered based on the predictor variable determined in the previous step.

2. The system of claim 1, wherein the determination information includes information related to device-dedicated information of a beacon scanner that transmits a scanner signal having a highest reception intensity in the moving tag among the scanner signals.

3. The system of claim 1, wherein the beacon scanner transmits location information of the moving tag, which is extracted based on second beacon information received from the moving tag, to a service server.

4. A system for determining a location of a moving tag based on a radio signal, the system comprising:
   a plurality of beacon scanners configured to broadcast scanner signals including device-dedicated information; and
   a moving tag configured to receive the scanner signals from the beacon scanners and operate in an active mode configured to broadcast a second beacon signal based on received intensities of the scanner signals, wherein the second beacon signal includes determination information related to device-dedicated information of at least one of the beacon scanners, and tag-dedicated information of the moving tag,
   wherein the moving tag is operable in a normal mode of broadcasting a first beacon signal including tag-dedicated information, and
   wherein the beacon scanner requests the moving tag to switch an operation mode of the moving tag from the normal mode to an active mode when the moving tag operates in the normal mode, and a reception intensity of the first beacon signal of the moving tag received by the beacon scanner corresponds to a predetermined criterion.

5. The system of claim 4, wherein a broadcasting interval of the second beacon signal in the active mode is shorter than a broadcasting interval of the first beacon signal in the normal mode.

6. The system of claim 4, wherein the beacon scanner includes:
at least one transmission module configured to transmit the scanner signal;
a trigger module configured to receive the first beacon signal and request the moving tag to switch an operation mode of the moving tag from the normal mode to the active mode; and
a reception module configured to receive the second beacon signal.

7. The system of claim 4, wherein the beacon scanner includes a trigger module configured to receive the first beacon signal and request the moving tag to switch an operation mode of the moving tag from the normal mode to the active mode, wherein
the trigger module includes:
receiving the first beacon signal;
determining whether a signal intensity of the first beacon signal is within a predetermined range;
requesting a scan response from the moving tag;
receiving the scan response from the moving tag; and
requesting a mode switching into the active mode while transmitting a key value to the moving tag, and wherein
the moving tag performs verification on the key value, and performs the mode switching into the active mode.

8. A method for determining a location of a moving tag based on a radio signal, the method comprising:
a first broadcasting step, in a plurality of beacon scanners, of broadcasting a scanner signal including device-dedicated information; and
a second broadcasting step, in the moving tag, of receiving the scanner signals from the beacon scanners, and operating in an active mode configured to broadcast a second beacon signal based on received intensities of the scanner signals, wherein
the second beacon signal includes determination information related to device-dedicated information of at least one among the beacon scanners, and tag-dedicated information of the moving tag,
wherein the active mode performs:
a signal collecting step of collecting scanner signals transmitted from the beacon scanners;
a signal filtering step of extracting a filter reception intensity filtered using a predetermined scheme with respect to reception intensities of the collected scanner signals;
a determination step of extracting determination information related to device-dedicated information of at least one among the beacon scanners, based on a plurality of filter reception intensities of the scanner signals of the beacon scanners; and
a broadcasting step of broadcasting the second beacon signal,
and wherein the extracting the filter reception intensity filtered using the predetermined scheme in the signal filtering step includes:
storing filtered filter reception intensity determined in a previous step and a predictor variable determined in a previous step, with respect to each scanner signal received from each of the beacon scanners, and
updating a signal intensity of a scanner signal received at a current step,
filtered filter reception intensity determined in a previous step, and
filter reception intensity and a predictor variable filtered based on the predictor variable determined in the previous step.

9. The method of claim 8, wherein the determination information includes information related to device-dedicated information of a beacon scanner that transmits a scanner signal having a highest reception intensity in the moving tag among the scanner signals.

10. The method of claim 8, further comprising:
a result transmitting step, in the beacon scanner, of transmitting the location information of the moving tag, which is extracted based on the second beacon information received from the moving tag, to a service server.

11. A method for determining a location of a moving tag based on a radio signal, the method comprising:
a first broadcasting step, in a plurality of beacon scanners, of broadcasting a scanner signal including device-dedicated information; and
a second broadcasting step, in the moving tag, of receiving the scanner signals from the beacon scanners, and operating in an active mode configured to broadcast a second beacon signal based on received intensities of the scanner signals, wherein
the second beacon signal includes determination information related to device-dedicated information of at least one among the beacon scanners, and tag-dedicated information of the moving tag,
wherein, in the second broadcasting step, the moving tag is operable in the normal mode of broadcasting the first beacon signal including the tag-dedicated information, and wherein
the method further comprises: a mode switching step of, by the beacon scanner, requesting the moving tag to switch an operation mode of the moving tag from the normal mode to an active mode, when the moving tag operates in the normal mode, and the reception intensity of the first beacon signal of the moving tag received by the beacon scanner corresponds to a predetermined criterion.

12. The method of claim 11, wherein a broadcasting interval of the second beacon signal in the active mode is shorter than a broadcasting interval of the first beacon signal in the normal mode.

13. The method of claim 11, further comprising:
a triggering step of, in the beacon scanner, receiving the first beacon signal and requesting the moving tag to change the operation mode of the moving tag from the normal mode to the active mode, wherein
the triggering step includes:
receiving the first beacon signal;
determining whether the signal intensity of the first beacon signal is within a predetermined range;
requesting a scan response from the moving tag;
receiving the scan response from the moving tag; and
requesting a mode switching into the active mode while transmitting a key value to the moving tag, and wherein
the method further comprises:
performing, by the moving tag, verification on the key value; and
performing the mode switching into the active mode.

* * * * *